US010785470B2

(12) United States Patent
Takematsu et al.

(10) Patent No.: US 10,785,470 B2
(45) Date of Patent: Sep. 22, 2020

(54) IMAGE PROCESSING APPARATUS, IMAGE PROCESSING METHOD, AND IMAGE PROCESSING SYSTEM

(71) Applicants: Toshiharu Takematsu, Tokyo (JP); Sachiyo Terada, Tokyo (JP); Yuki Nakamura, Tokyo (JP)

(72) Inventors: Toshiharu Takematsu, Tokyo (JP); Sachiyo Terada, Tokyo (JP); Yuki Nakamura, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 16/118,872

(22) Filed: Aug. 31, 2018

(65) Prior Publication Data

US 2018/0376130 A1    Dec. 27, 2018

Related U.S. Application Data

(63) Continuation of application No. PCT/JP2017/000861, filed on Jan. 12, 2017.

(30) Foreign Application Priority Data

Mar. 15, 2016  (JP) .................................. 2016-051471

(51) Int. Cl.
*H04N 7/00* (2011.01)
*H04N 13/275* (2018.01)
(Continued)

(52) U.S. Cl.
CPC ....... *H04N 13/275* (2018.05); *G06K 9/00664* (2013.01); *G06T 3/0018* (2013.01);
(Continued)

(58) Field of Classification Search
CPC .......... G06K 9/00664; G06K 9/00697; G06K 9/00281; G06T 11/60; G06T 15/04; G06T 19/00; G06T 3/0018; G06T 15/205; G11B 27/031; G06F 17/5009; G01B 11/25; A61B 8/0841
(Continued)

(56) References Cited

U.S. PATENT DOCUMENTS 6,914,599 B1 * 7/2005  Rowe ...................... G06T 17/00
                                                     345/420
9,736,371 B2    8/2017  Taneichi et al.
(Continued)

FOREIGN PATENT DOCUMENTS

EP      2518686      10/2012
EP      2602792      6/2013
(Continued)

OTHER PUBLICATIONS

International Search Report dated Feb. 14, 2017 in PCT/JP2017/000861 filed on Jan. 12, 2017.
(Continued)

*Primary Examiner* — Gims S Philippe
(74) *Attorney, Agent, or Firm* — IPUSA, PLLC

(57) ABSTRACT

An image processing apparatus is provided that inputs a first image and a second image and generates an output image by arranging the second image onto a 3D model having the first image arranged thereon.

10 Claims, 28 Drawing Sheets

(51) Int. Cl.
   G06T 19/00     (2011.01)
   H04N 5/232     (2006.01)
   H04N 5/225     (2006.01)
   G06T 3/00      (2006.01)
   G11B 27/34     (2006.01)
   G06T 11/60     (2006.01)
   G11B 27/28     (2006.01)
   G11B 27/031    (2006.01)
   G06T 15/04     (2011.01)
   H04N 13/156    (2018.01)
   G06K 9/00      (2006.01)

(52) U.S. Cl.
   CPC .......... G06T 11/60 (2013.01); G06T 15/04 (2013.01); G06T 19/00 (2013.01); G11B 27/031 (2013.01); G11B 27/28 (2013.01); G11B 27/34 (2013.01); H04N 5/225 (2013.01); H04N 5/232 (2013.01); H04N 5/23238 (2013.01); H04N 5/23296 (2013.01); H04N 5/23299 (2018.08); H04N 13/156 (2018.05)

(58) Field of Classification Search
   USPC .......................................... 348/36
   See application file for complete search history.

(56) References Cited

U.S. PATENT DOCUMENTS

| | | | |
|---|---|---|---|
| 9,756,242 B2 | 9/2017 | Harada et al. | |
| 9,782,147 B2 * | 10/2017 | Martin | A61B 8/0841 |
| 2005/0018209 A1 * | 1/2005 | Lemelin | G01B 11/25 |
| | | | 356/604 |
| 2008/0211809 A1 * | 9/2008 | Kim | G06K 9/00697 |
| | | | 345/420 |
| 2011/0110605 A1 | 5/2011 | Cheong | |
| 2012/0177284 A1 * | 7/2012 | Wang | G06T 15/205 |
| | | | 382/154 |
| 2013/0100132 A1 | 4/2013 | Katayama et al. | |
| 2013/0314402 A1 * | 11/2013 | Furumura | G03B 35/02 |
| | | | 345/419 |
| 2014/0368426 A1 | 12/2014 | Umehara et al. | |
| 2015/0077416 A1 | 3/2015 | Villmer | |
| 2015/0261899 A1 * | 9/2015 | Atohira | G06F 17/5009 |
| | | | 703/7 |
| 2016/0148425 A1 * | 5/2016 | Hwang | G06K 9/00281 |
| | | | 345/419 |

FOREIGN PATENT DOCUMENTS

| | | |
|---|---|---|
| JP | 2009-188780 | 8/2009 |
| JP | 2014-006880 | 1/2014 |
| JP | 2014-030104 | 2/2014 |
| JP | 2014-131215 | 7/2014 |
| JP | 2015-001760 | 1/2015 |
| JP | 2015-018013 | 1/2015 |
| KR | 10-2011-0052124 | 5/2011 |

OTHER PUBLICATIONS

Extended European Search Report for 17766022.2 dated Jan. 29, 2019.
Korean Office Action for 10-2018-7026218 dated Nov. 13, 2019.

* cited by examiner

FIG.20

| RANGE | OUTPUT MAGNIFICATION | ZOOM DESIGNATION VALUE ZP | FIELD ANGLE ω | PARAMETER TO BE CHANGED | | NOTE |
|---|---|---|---|---|---|---|
| A~B | viewWH/imgWH*imageDeg/ω | 60~120 ω=ZP | 60°~120° | d=0~1 | d=ω/60−1 | MOVEMENT WITHIN STEREOSPHERE. FIX AT VIEWING ANGLE α=60° |
| B~C | | 120~240 ω=ZP | 120°~240° | α=60~120 | α=ω/2 | FIX AT MOVING AMOUNT d=1 |
| C~D | | 240~268.5 ω≠ZP | 240°~300° | d=1~dmax1 | d=1+(dmax2−1)*(ZP−240)/120 | FIX AT VIEWING ANGLE α=120° MAXIMUM DISPLAY DISTANCE dmax1 IS BASED ON SIZE OF OUTPUT REGION |
| D~E | viewWH/imgWH*360/ω *tan(asin(1/d)/tan(α/2)) | 268.5~300 ω≠ZP | 300°~278° | d=dmax1 ~dmax2 | d=1+(dmax2−1)*(ZP−240)/120 | FIX AT VIEWING ANGLE α=120° UPPER LIMIT DISPLAY DISTANCE dmax2 IS BASED ON SIZE OF OUTPUT REGION |

FIG.21
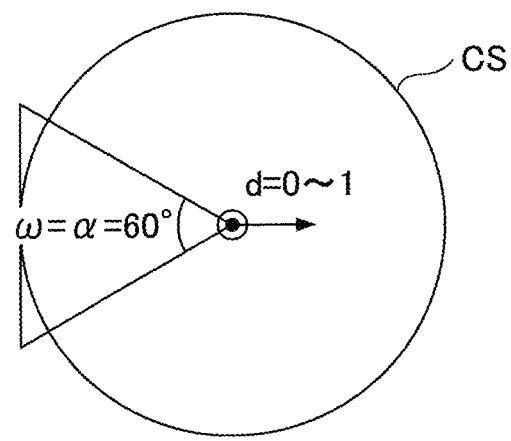
FIG.22
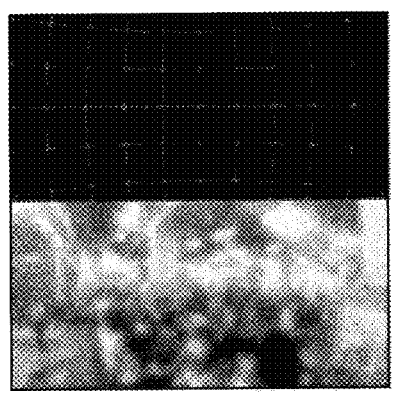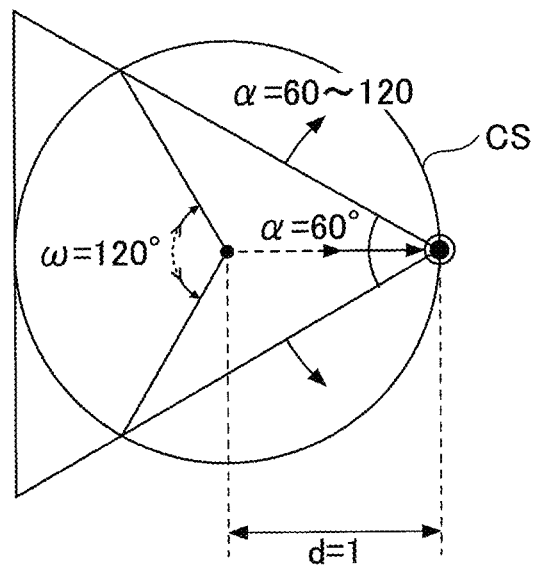

FIG.23
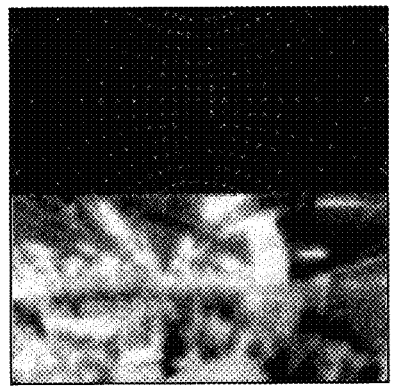 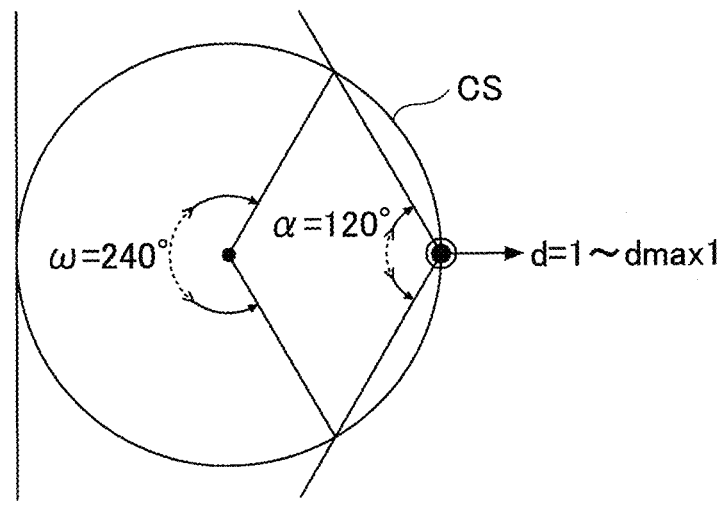
FIG.24
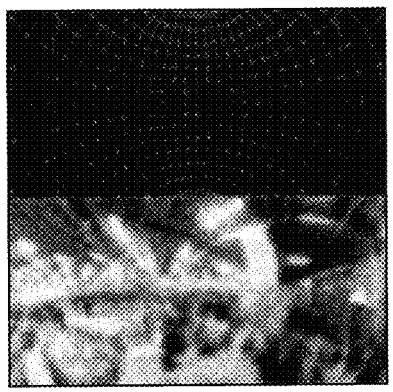 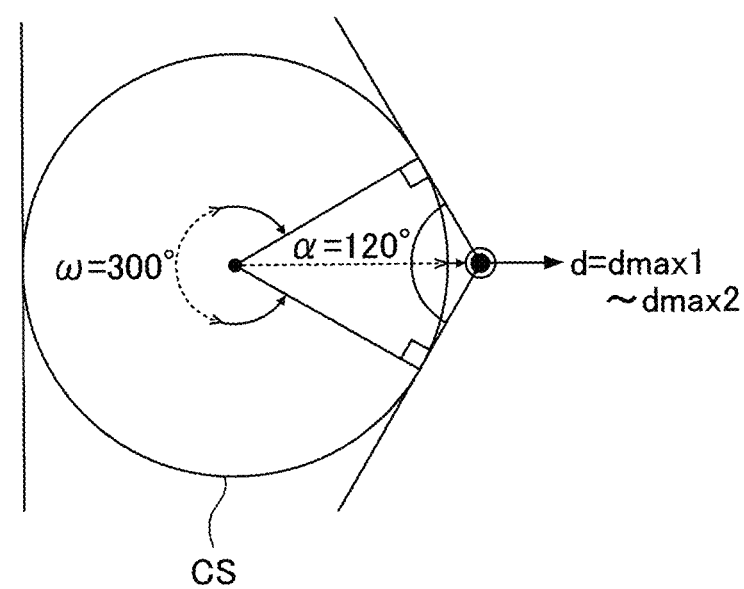

FIG.28
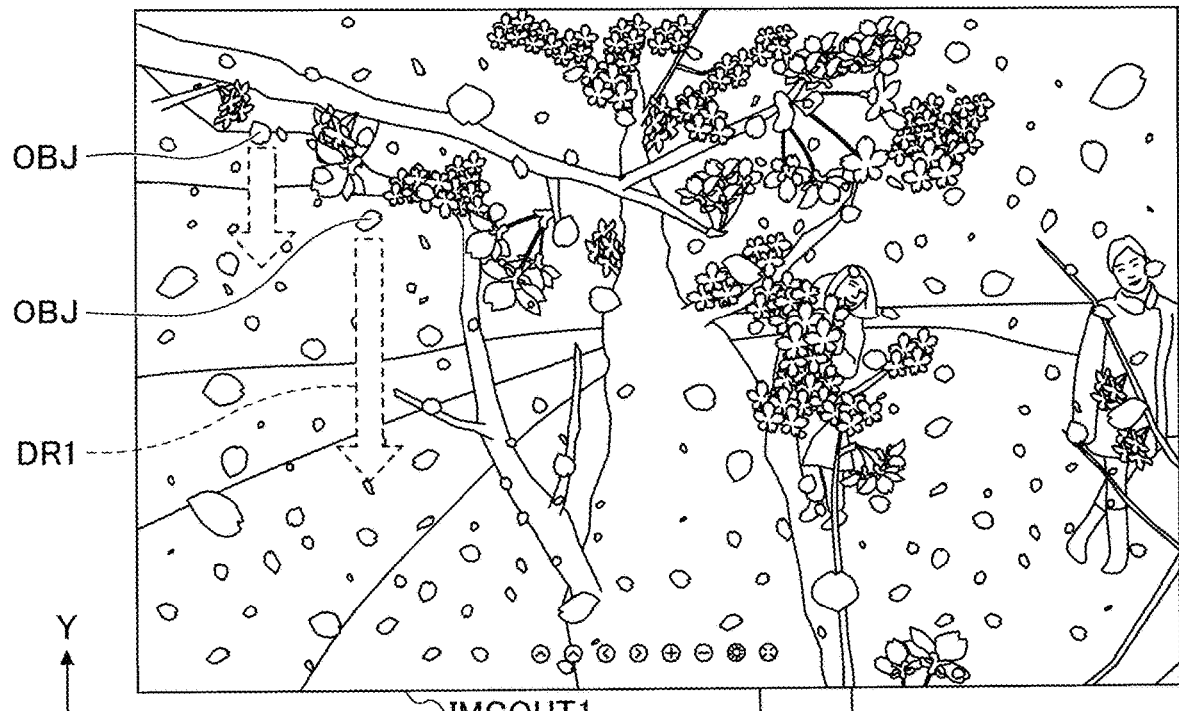
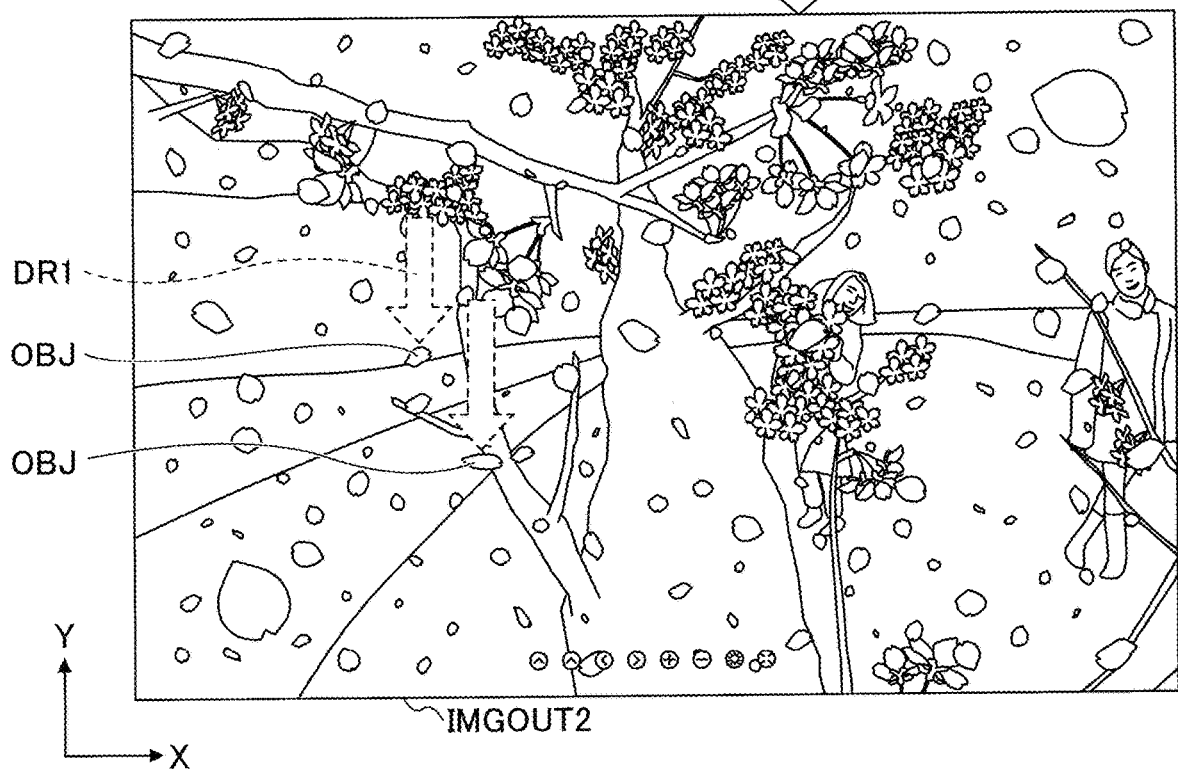

IMAGE PROCESSING APPARATUS, IMAGE PROCESSING METHOD, AND IMAGE PROCESSING SYSTEM

CROSS-REFERENCE TO RELATED APPLICATIONS

The present application is a continuation application filed under 35 U.S.C. 111(a) claiming benefit under 35 U.S.C. 120 and 365(c) of PCT International Application No. PCT/JP2017/000861 filed on Jan. 12, 2017 and designating the U.S., which claims priority to Japanese Patent Application No. 2016-051471 filed on Mar. 15, 2016. The entire contents of the foregoing applications are incorporated herein by reference.

BACKGROUND OF THE INVENTION

1. Field of the Invention

The present invention relates to an image processing apparatus, an image processing method, and an image processing system.

2. Description of the Related Art

Techniques for displaying a panoramic image are known. Also, user interfaces (hereinafter referred to as "UI") for accepting a user's instruction for displaying a panoramic image are known.

For example, a technique is known that involves having a communication terminal display thumbnails associated with predetermined region images within a panoramic image, accept an instruction to select a predetermined thumbnail, and thereby display the predetermined region image associated with the selected thumbnail. In this way, a user can easily search for a desired panoramic image or a desired predetermined region image of a panoramic image (see, e.g., Japanese Unexamined Patent Publication No. 2014-6880).

Also, a technique is known that involves having a computer first generate a partial image corresponding to a partial region of an image that has a given viewpoint of the image at its center, and display a viewpoint list image including multiple thumbnails of partial images together with the image. Then, the computer receives from a server apparatus, comment information associating a partial image with a user's comment on the partial image, and displays the number of comments for each of the thumbnails of partial images included in the viewpoint list image. In this way, a user may be able to determine the viewpoint in the image that attracts a high degree of attention (see, e.g., Japanese Unexamined Patent Publication No. 2015-18013).

Also, when a user downloads image data from an image management system using a receiving apparatus, the receiving apparatus may be configured to download additional information from an additional information management system based on corresponding image identification information of the image data. In this way, metadata may be available when the user performs image processing such as image data correction (see, e.g., Japanese Unexamined Patent Publication No. 2014-30104).

However, there are no conventional techniques that enable newly adding an image onto a panoramic image to produce an enhanced presentation effect, for example.

SUMMARY OF THE INVENTION

One aspect of the present invention is directed to providing an image processing apparatus that is capable of newly adding an image to produce an enhanced presentation effect.

According to one embodiment of the present invention, an image processing apparatus is provided that includes processing circuitry configured to input a first image and a second image, and generate an output image by arranging the second image onto a 3D model having the first image arranged thereon.

BRIEF DESCRIPTION OF THE DRAWINGS

FIG. 20 is a table describing the alternative zooming process according to an embodiment of the present invention;

FIG. 21 is a first diagram illustrating an example "range" of the alternative zooming process according to an embodiment of the present invention;

FIG. 22 is a second diagram illustrating an example "range" of the alternative zooming process according to an embodiment of the present invention;

FIG. 23 is a third diagram illustrating an example "range" of the alternative zooming process according to an embodiment of the present invention;

FIG. 24 is a fourth diagram illustrating an example "range" of the alternative zooming process according to an embodiment of the present invention;

FIG. 28 is a diagram illustrating an example output image according to an embodiment of the present invention;

DESCRIPTION OF THE EMBODIMENTS

In the following, embodiments of the present invention are described with reference to the accompanying drawings.

<Image Processing System Overall Configuration>

Figure 1:
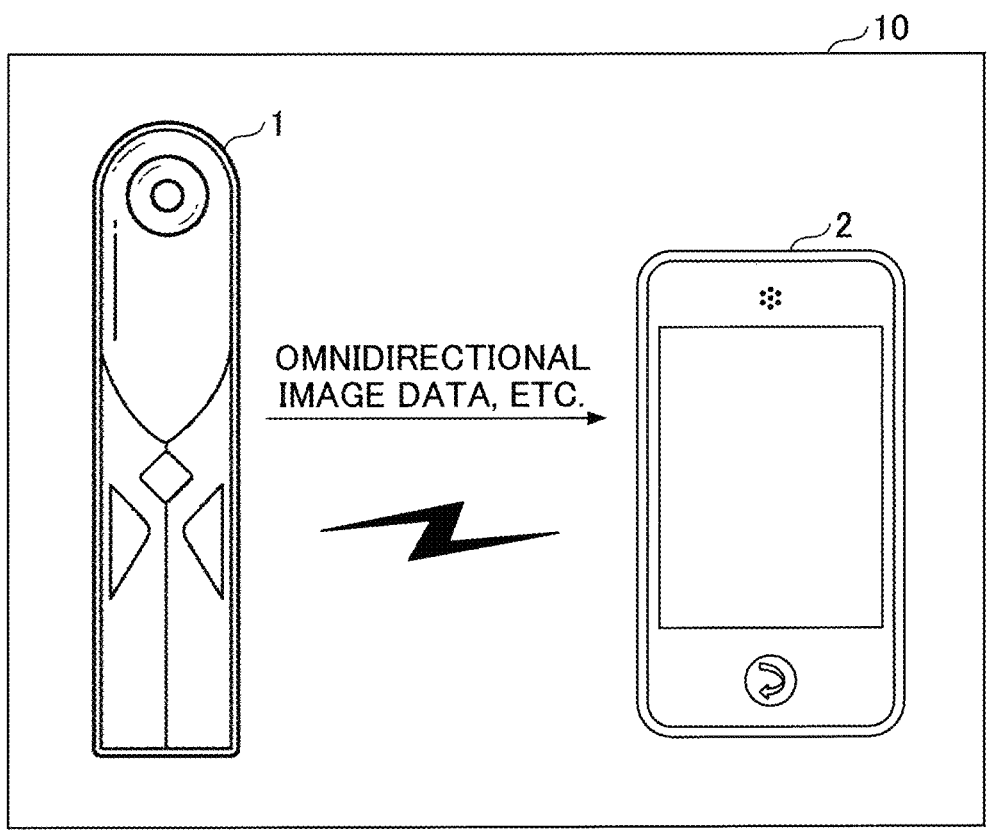
FIG. 1 is a diagram illustrating an example overall configuration of an image processing system according to an embodiment of the present invention.

FIG. 1 is a diagram illustrating an example overall configuration of an image processing system 10 according to an embodiment of the present invention. In the illustrated example, the image processing system 10 includes an image capturing apparatus 1 and a smartphone 2 as an example of an image processing apparatus.

The image capturing apparatus 1 is a camera or the like that includes a plurality of optical systems. For example, the image capturing apparatus 1 may generate an image covering a wide visual field, such as an omnidirectional image, based on images captured using a plurality of optical systems. Then, the image capturing apparatus 1 may output the omnidirectional image or the like to the smartphone 2. In turn, the smartphone 2 may perform image processing on the omnidirectional image or some other input image. In the following, an example where an omnidirectional image corresponds to an input image, namely, a first image, will be described. In the following description, a panoramic image includes an omnidirectional image.

Further, in the present example, the image capturing apparatus 1 and the smartphone 2 may be connected by wire or wirelessly. For example, the smartphone 2 may download from the image capturing apparatus 1, data including omnidirectional image data output by the image capturing apparatus 1. Note that the image capturing apparatus 1 and the smartphone 2 may be connected via a network or the like.

Note that the overall configuration of the image processing system 10 is not limited to the illustrated configuration. For example, the image capturing apparatus 1 and the smartphone 2 may be an integrated apparatus. For example, a display apparatus other than the smartphone 2, such as a personal computer or a mobile phone, may also be used as the image processing apparatus. The image processing system 10 may further include an information processing apparatus or the like in addition to the image capturing apparatus 1 and the smartphone 2.

<Image Capturing Apparatus>

The image capturing apparatus 1 (FIG. 1) may be an apparatus as described below, for example.

Figure 2:
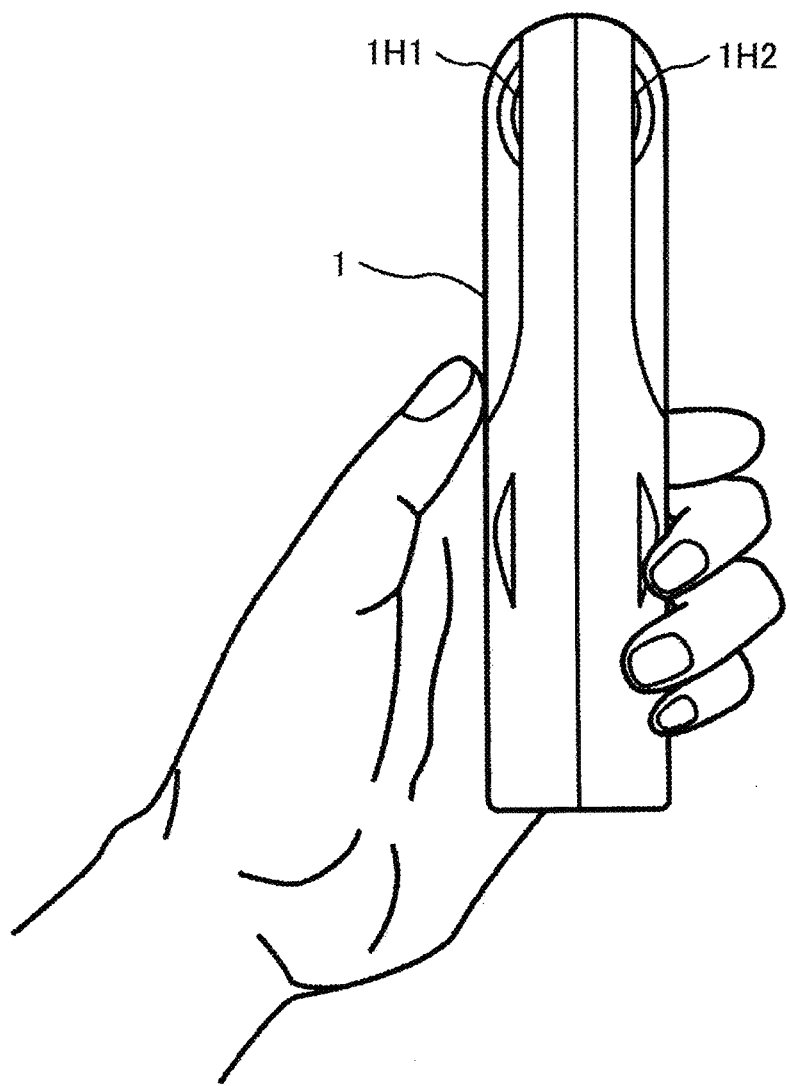
FIG. 2 is a first diagram illustrating an image capturing apparatus according to an embodiment of the present invention.
Figure 3:
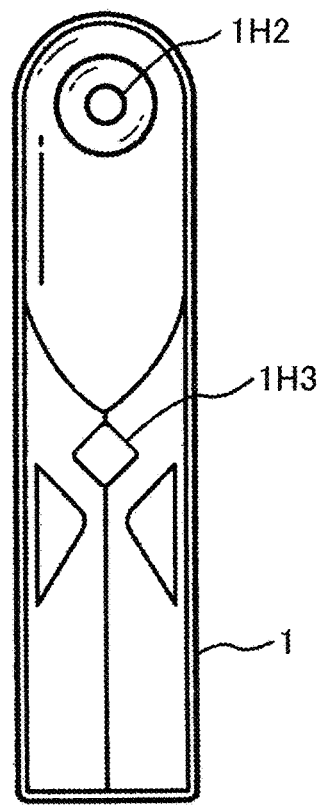
FIG. 3 is a second diagram illustrating the image capturing apparatus according to an embodiment of the present invention.
Figure 4:
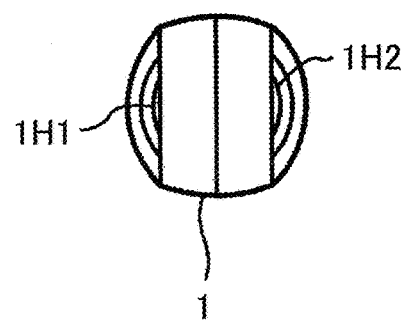
FIG. 4 is a third diagram illustrating the image capturing apparatus according to an embodiment of the present invention.

FIGS. 2 to 4 are diagrams illustrating an example of the image capturing apparatus 1 according to an embodiment of the present invention. Note that FIGS. 2 to 4 are example external views of the image capturing apparatus 1. Specifically, FIG. 2 is an example front view of the image capturing apparatus 1. FIG. 3 is an example left side view of the image capturing apparatus 1. Further, FIG. 4 is an example plan view of the image capturing apparatus 1.

The image capturing apparatus 1 includes a front side image capturing element 1H1, a rear side image capturing element 1H2, and a switch 1H3. In the present example, optical systems such as the front side image capturing element 1H1 and the rear side image capturing element 1H2 are used for capturing an image. Based on images captured using the respective optical systems, the image capturing apparatus 1 generates an omnidirectional image. Note that a method for generating an omnidirectional image will be described in detail below.

The switch 1H3 is a so-called shutter release button and is an example of an input device for enabling a user to input an image capturing instruction to the image capturing apparatus 1.

For example, as illustrated in FIG. 2, when the user holds the image capturing apparatus 1 with his/her hand and presses the switch 1H3, the image capturing apparatus 1 may perform an image capturing operation. Specifically, the image capturing apparatus 1 may be used in the manner illustrated in FIG. 5 to capture an image, for example.

Figure 5:
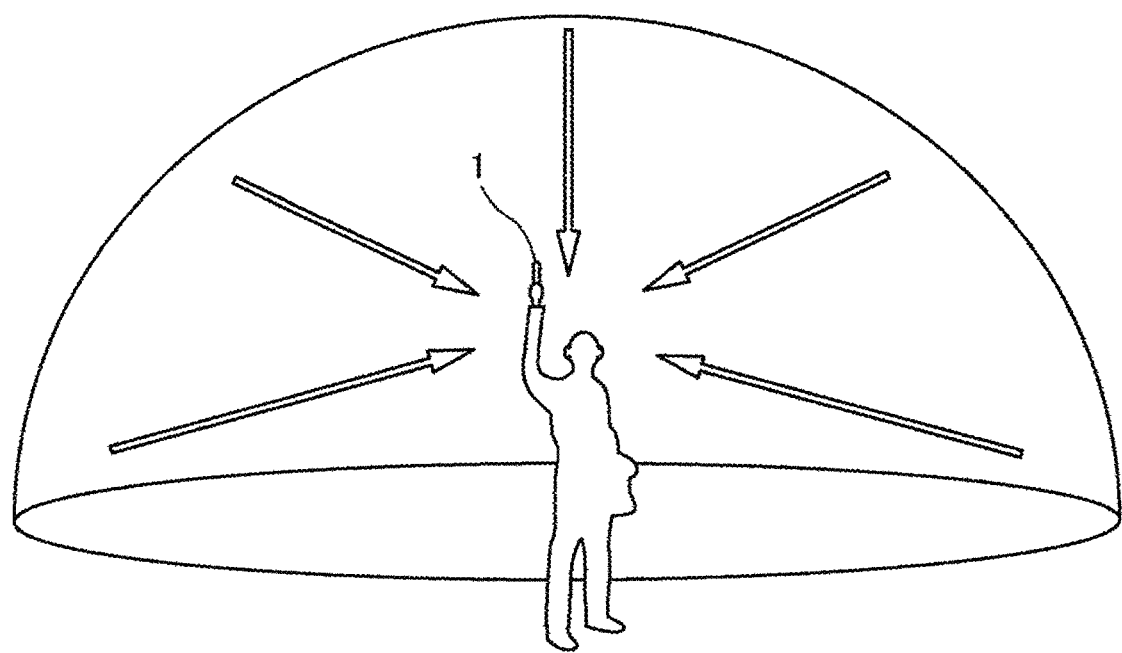
FIG. 5 is a diagram illustrating an example image capturing operation by the image capturing apparatus according to an embodiment of the present invention.

FIG. 5 is a diagram illustrating an example of the image capturing apparatus 1 capturing an image according to an embodiment of the present invention. The user holds the image capturing apparatus 1 with his/her hand and presses the switch 1H3 as illustrated in FIG. 3 to capture an image. In this way, the image capturing apparatus 1 can capture an image covering all directions of the image capturing apparatus 1 using the front side image capturing element 1H1

(FIG. 2) and the rear side image capturing element 1H2 (FIG. 2). An image captured in the above-described manner may be an image as illustrated in FIG. 6, for example.

Figure 6:
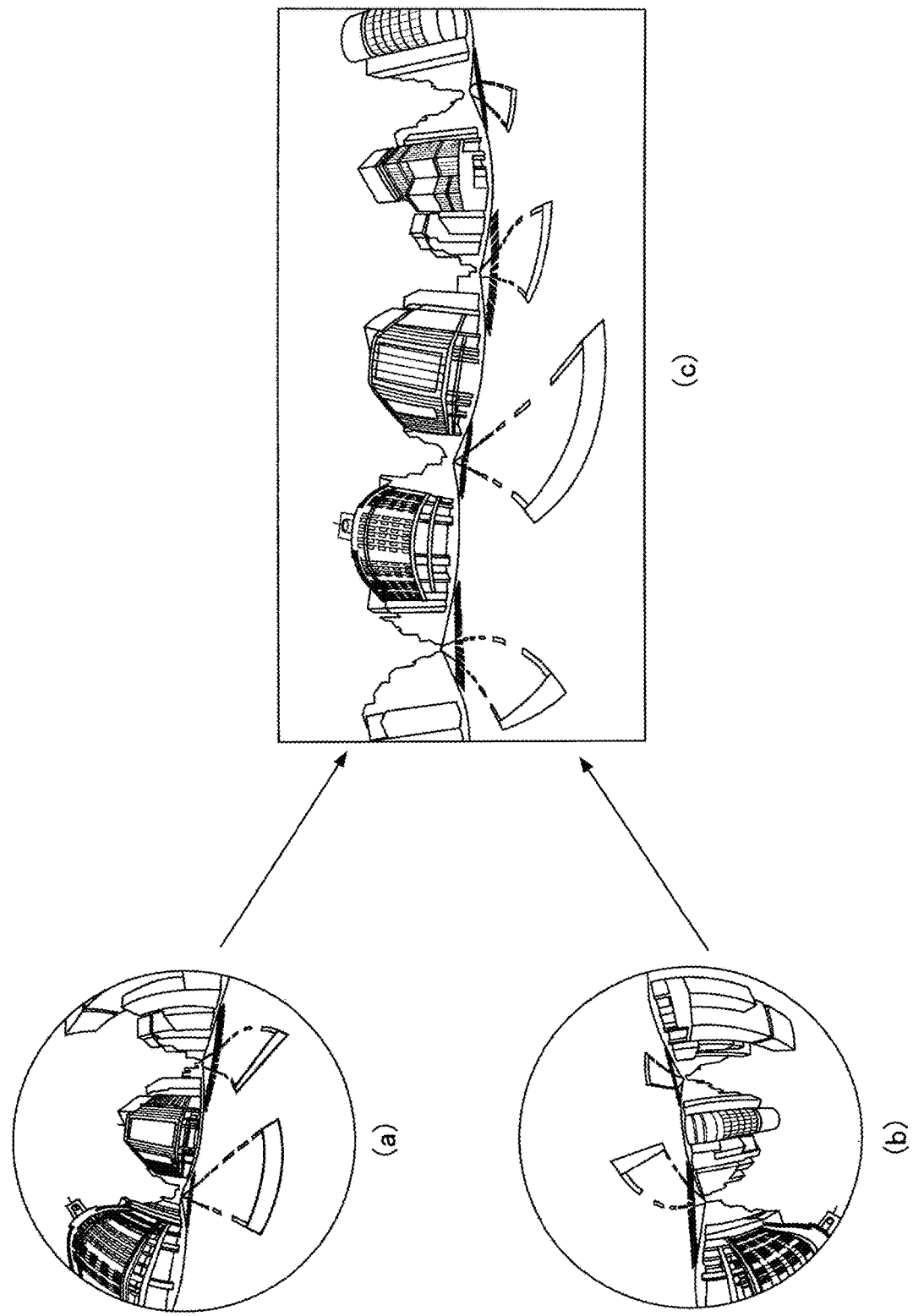
FIG. 6 is a diagram illustrating an example image captured by the image capturing apparatus according to an embodiment of the present invention.

FIG. 6 is a diagram illustrating an example of an image captured by the image capturing apparatus 1 according to an embodiment of the present invention. Specifically, in FIG. 6, (a) illustrates an example of an image captured by the front side image capturing element 1H1 (FIG. 2). On the other hand, (b) illustrates an example of an image captured by the rear side image capturing element 1H2 (FIG. 2). In FIG. 6, (c) illustrates an example of an image generated based on the image captured by the front side image capturing element 1H1, namely, the image (a) in FIG. 6, and the image captured by the rear side image capturing element 1H2, namely, the image (b) in FIG. 6.

As illustrated in (a) of FIG. 6, the image captured by the front side image capturing element 1H1 is an image capturing a wide range across the front side of the image capturing apparatus 1 and may be an image having a field angle of 180° as the image capturing range, for example. Also, as illustrated, the image captured by the front side image capturing element 1H1 may have distortions in a case where the front side image capturing element 1H1 uses an optical system for capturing a wide range, such as a so-called fisheye lens, for example. That is, the image illustrated in (a) of FIG. 6 is a so-called hemispherical image (hereinafter referred to as "hemispherical image") that captures a wide range across one side of the image capturing apparatus 1 and has distortions.

The field angle of each optical system is preferably in the range from 180° to 200°. In particular, when the field angle exceeds 180°, overlapping image regions may be included in the hemispherical image in (a) of FIG. 6 and the hemispherical image in (b) of FIG. 6 to facilitate their synthesis in generating an omnidirectional image.

On the other hand, as illustrated in (b) of FIG. 6, the image captured by the rear side image capturing element 1H2 is an image capturing a wide range across the rear side of the image capturing apparatus 1 and may be an image having a field angle of 180° as the image capturing range, for example. Thus, the image captured by the rear side image capturing element 1H2 is also a hemispherical image similar to the image illustrated in (a) of FIG. 6.

Next, the image capturing apparatus 1 performs image processing, such as distortion correction processing and image synthesis processing, to generate the image as illustrated in (c) of FIG. 6 based on the front side hemispherical image as illustrated in (a) of FIG. 6 (a) and the rear side hemispherical image as illustrated in (b) of FIG. 6. That is, the image illustrated in (c) of FIG. 6 is an example of an image, namely, an omnidirectional image, generated by the so-called Mercator projection method or the equidistant cylindrical projection method, for example.

Note that the first image is not limited to an image generated by the image capturing apparatus 1. For example, the first image may be an image captured by another camera, or an image generated based on an image captured by another camera, for example. Note that the first image is preferably an image having a wide viewing angle range captured using a so-called omnidirectional camera or a so-called wide-angle lens camera, for example.

In the following description, an omnidirectional image will be described as an example of the first image. However, the first image is not limited to an omnidirectional image. For example, the first image may be an image captured by a compact camera, a single lens reflex camera, a smartphone, or the like. The image may also be a horizontally or vertically extending panoramic image, for example.

Further, although the shutter release button is controlled based on the operation of the user pressing the switch 1H3 in the present example, the shutter release button may also be controlled remotely from a display apparatus such as the smartphone 2, for example.

<Image Capturing Apparatus Hardware Configuration>

Figure 7:
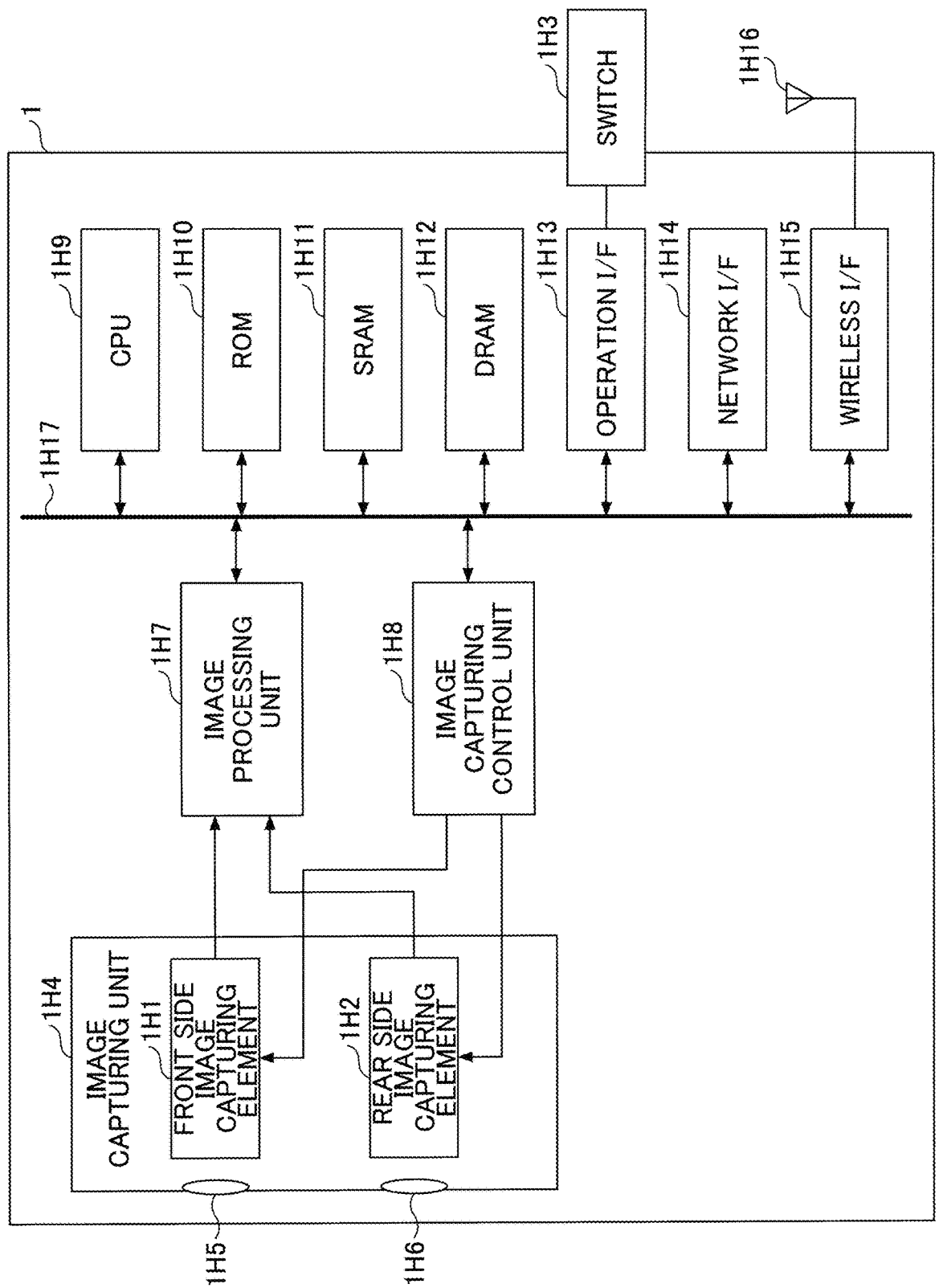
FIG. 7 is a block diagram illustrating an example hardware configuration of the image capturing apparatus according to an embodiment of the present invention.

FIG. 7 is a block diagram illustrating an example hardware configuration of the image capturing apparatus 1 according to an embodiment of the present invention. In FIG. 7, the image capturing apparatus 1 includes an image capturing unit 1H4, an image processing unit 1H7, an image capturing control unit 1H8, a CPU (Central Processing Unit) 1H9, and a ROM (Read-Only Memory) 1H10. Also, the image capturing apparatus 1 includes a SRAM (Static Random Access Memory) 1H11, a DRAM (Dynamic Random Access Memory) 1H12, and an operation I/F (Interface) 1H13. Further, the image capturing apparatus 1 includes a network I/F 1H14, a wireless I/F 1H15, and an antenna 1H16. The hardware elements of the image capturing apparatus 1 are connected to each other via a bus 1H17 so that data and signals may be input/output to/from the hardware elements via the bus 1H17.

The image capturing unit 1H4 includes the front side image capturing element 1H1 and the rear side image capturing element 1H2. The image capturing unit 1H4 further includes a lens 1H5 for the front side image capturing element 1H1 and a lens 1H6 for the rear side image capturing element 1H2.

The front side image capturing element 1H1 and the rear side image capturing element 1H2 are so-called camera units. Specifically, the front side image capturing element 1H1 and the rear side image capturing element 1H2 each include an optical sensor such as a CMOS (Complementary Metal Oxide Semiconductor) or a CCD (Charge Coupled Device). The front side image capturing element 1H1 converts light incident through the lens 1H5 to generate image data representing a hemispherical image or the like. Similarly, the rear side image capturing element 1H2 converts light incident through the lens 1H6 to generate image data representing a hemispherical image or the like.

In turn, the image capturing unit 1H4 outputs the image data respectively generated by the front side image capturing element 1H1 and the rear side image capturing element 1H2 to the image processing unit 1H7. Note that the output image data may correspond to the front side hemispherical image illustrated in (a) of FIG. 6 and the rear side hemispherical image illustrated in (b) of FIG. 6, for example.

Note that the front side image capturing element 1H1 and the rear side image capturing element 1H2 may further include other optical elements such as an aperture stop or a low-pass filter in addition to a lens to perform high-quality image capturing. Also, the front side image capturing element 1H1 and the rear side image capturing element 1H2 may perform so-called defect pixel correction or so-called image stabilization (camera shake correction) in order to perform high-quality image capturing.

The image processing unit 1H7 generates an omnidirectional image as illustrated in (c) of FIG. 6, for example, based on image data input from the image capturing unit 1H4. Note that a process of generating the omnidirectional image will be described in detail below.

The image capturing control unit 1H8 is a control device for controlling the hardware elements of the image capturing apparatus 1.

The CPU 1H9 is a computing device and a control device for performing computations and data processing for implementing various processes and controlling the hardware elements of the image capturing apparatus 1. For example, the CPU 1H9 may execute various processes based on a program installed in advance.

The ROM 1H10, the SRAM 1H11, and the DRAM 1H12 are examples of storage devices. Specifically, the ROM 1H10 may store programs, data, parameters, and the like for causing the CPU 1H9 to execute various processes, for example. The SRAM 1H11 and the DRAM 1H12 may store programs used by the CPU 1H9 to execute a process based on a program, data used by the programs, and data generated by the programs, for example. The image capturing apparatus 1 may further include an auxiliary storage device such as a hard disk.

The operation I/F 1H13 is connected to an input device such as the switch 1H3 and is an interface for performing a process of inputting a user operation to the image capturing apparatus 1. For example, the operation I/F 1H13 may include an input device such as a switch, a connector for connecting the input device, a cable, a circuit for processing a signal input from the input device, a driver, a control device, and the like. Note that the operation I/F 1H13 may further include an output device such as a display. Further, the operation I/F 1H13 may be a so-called touch panel integrating an input device and an output device, for example. Further, the operation I/F 1H13 may include an interface such as USB (Universal Serial Bus) so that a recording medium such as a flash memory can be connected to the image capturing apparatus 1. In this way, the operation I/F 1H13 may enable the image capturing apparatus 1 to input/output data to/from the recording medium.

The switch 1H3 may be a power switch or a parameter input switch for performing operations other than operations related to the shutter.

The network I/F 1H14, the wireless I/F 1H15, and the antenna 1H16 connect the image capturing apparatus 1 to an external apparatus by wire or wirelessly. For example, the image capturing apparatus 1 may be connected to a network via the network I/F 1H14 to transmit data to the smartphone 2 (FIG. 1). Note that the network I/F 1H14, the wireless I/F 1H15, and the antenna 1H16 may be hardware for establishing connection with an external apparatus by wire such as a USB, for example. That is, the network I/F 1H14, the wireless I/F 1H15, and the antenna 1H16 may be a connector, a cable, or the like.

The bus 1H17 is used to input/output data and the like to/from the hardware elements of the image capturing apparatus 1. That is, the bus 1H17 is a so-called internal bus. Specifically, the bus 1H17 may be a PCI Express (Peripheral Component Interconnect Bus Express) bus or the like.

Note that the image capturing apparatus 1 is not limited to a configuration including two image capturing elements. For example, the image capturing apparatus 1 may include three or more image capturing elements. Further, the image capturing apparatus 1 may be configured to capture a plurality of partial images by changing the image capturing angle of one image capturing element, for example. Also, the image capturing apparatus 1 is not limited to an optical system using a fish-eye lens. For example, a wide-angle lens may be used.

Note that one or more processes performed by the image capturing apparatus 1 may alternatively be performed by another apparatus. For example, the image capturing apparatus 1 may transmit data, parameters, and the like, and the smartphone 2 or some other information processing apparatus connected via a network may perform a part or all of the processes to be performed by the image capturing apparatus 1. In this way, the image processing system 10 may include a plurality of information processing apparatuses that perform processes in a distributed, redundant, or parallel manner.

<Information Processing Apparatus Hardware Configuration>

Figure 8:
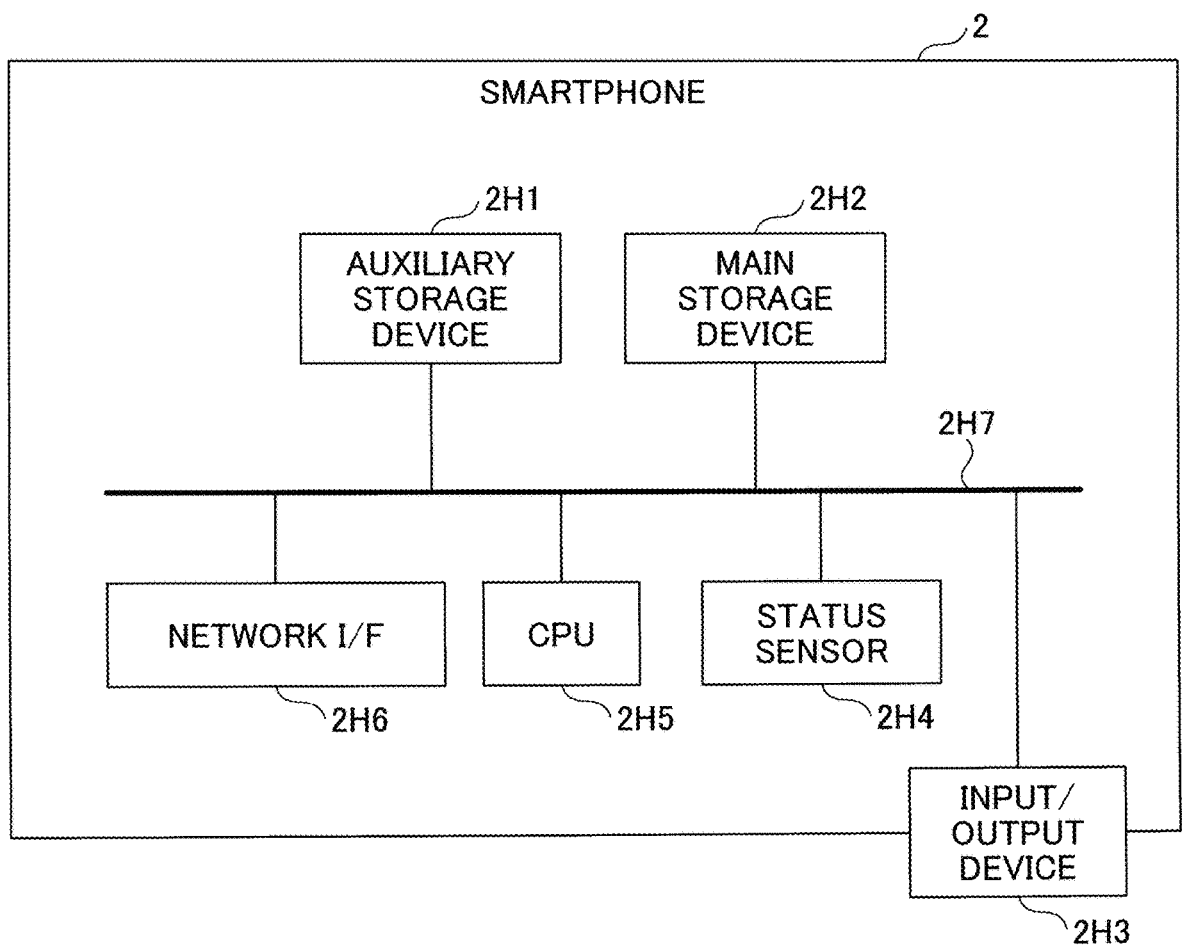
FIG. 8 is a block diagram illustrating an example hardware configuration of a smartphone according to an embodiment of the present invention.

FIG. 8 is a block diagram illustrating an example hardware configuration of the smartphone 2 according to an embodiment of the present invention. In FIG. 8, the smartphone 2 as an example of an information processing apparatus includes an auxiliary storage device 2H1, a main storage device 2H2, an input/output device 2H3, a status sensor 2H4, a CPU 2H5, and a network I/F 2H6. The hardware elements of the smartphone 2 are connected to each other by a bus 2H7 so that data and signals may be input/output to/from the hardware elements via the bus 2H7.

The auxiliary storage device 2H1 stores data, parameters, programs, and the like. More specifically, the auxiliary storage device 2H1 may be a hard disk, a flash SSD (Solid State Drive), or the like. Note that a part or all of the data stored in the auxiliary storage device 2H1 may be redundantly or alternatively stored in a file server connected to the smartphone 2 via the network I/F 2H6, for example.

The main storage device 2H2 is a so-called memory or the like that provides a storage area used by a program for executing a process. That is, the main storage device 2H2 stores data, programs, parameters, and the like. Specifically, the main storage device 2H2 may be a SRAM (Static Random Access Memory), a DRAM, or the like. The main storage device 2H2 may further include a control device that performs storage and retrieval, for example.

The input/output device 2H3 includes an output device that displays an image, a processing result, or the like, and an input device that inputs a user operation. Specifically, the input/output device 2H3 may include a so-called touch panel, a peripheral circuit, a driver, and the like. The input/output device 2H3 may display to a user, a predetermined GUI (Graphical User Interface) and an image that has undergone image processing, for example. Also, when the user operates the displayed GUI or image, the input/output device 2H3 may input the operation by the user.

The status sensor 2H4 is a sensor that detects the status of the smartphone 2. More specifically, the status sensor 2H4 may be a gyro sensor, an angle sensor, or the like. For example, the status sensor 2H4 may determine whether one side from among the sides of the smartphone 2 forms an angle greater than a predetermined angle with respect to the horizontal direction. That is, the status sensor 2H4 may detect whether the smartphone 2 is in a vertical orientation or a horizontal orientation.

The CPU 2H5 is a computing device and a control device that performs computations and data processing for implementing various processes and controls hardware elements of the smartphone 2. Note that the CPU 2H5 may include a plurality of CPUs, devices, or a plurality of cores in order to implement processes in parallel, redundantly or in a distributed manner, for example. Also, the smartphone 2 may include an internal or external GPU (Graphics Processing Unit) or the like in order to perform image processing, for example.

The network I/F 2H6 is connected to an external apparatus, wirelessly or by wire, via a network. Specifically, the network I/F 2H6 may include an antenna, a peripheral circuit, a driver, and the like for inputting/outputting data and the like. For example, the smartphone 2 may use the CPU 2H5 and the network I/F 2H6 to input image data from the image capturing apparatus 1 (FIG. 1). Also, the smartphone 2 may use the CPU 2H5 and the network I/F 2H6 to output data and the like to the image capturing apparatus 1, for example.

Note that the information processing apparatus is not limited to a smartphone. That is, the information processing apparatus may be a computer other than a smartphone. For example, the information processing apparatus may be a PC (Personal Computer), a PDA (Personal Digital Assistance), a tablet, a mobile phone, or a combination thereof.

<Image Processing System Overall Process>

Figure 9:
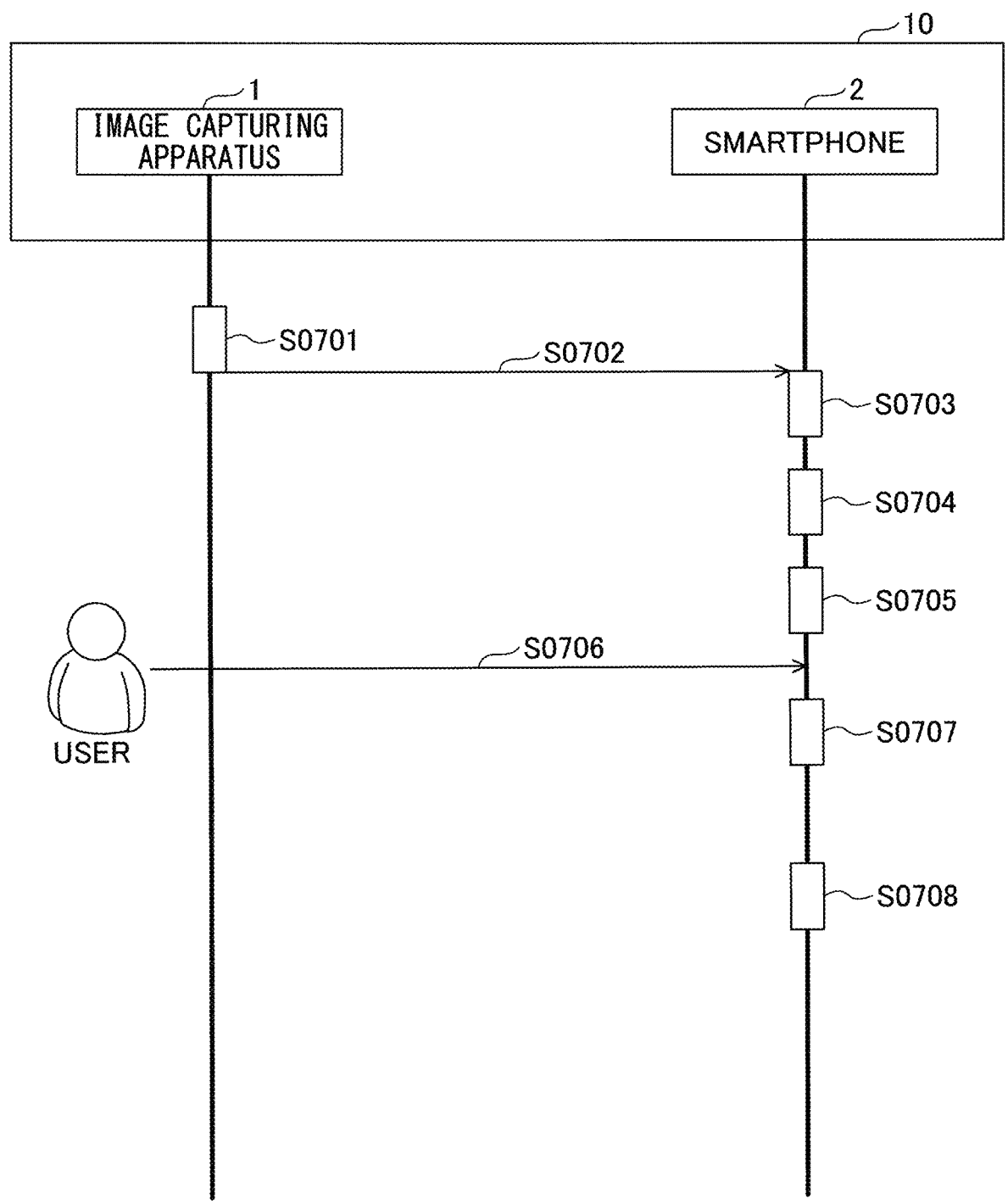
FIG. 9 is a sequence chart illustrating an example overall process implemented by the image processing system according to an embodiment of the present invention.

FIG. 9 is a sequence chart illustrating an example overall process implemented by the image processing system 10 according to an embodiment of the present invention. For example, the image processing system 10 may perform the following process operations to generate an output image.

In step S0701, the image capturing apparatus 1 performs a process of generating an omnidirectional image. Note that the omnidirectional image may be generated from hemispherical images as illustrated in (a) and (b) of FIG. 6 that are captured in advance by the image capturing apparatus 1 through processes as illustrated in FIGS. 10 to 13, for example.

Figure 10:
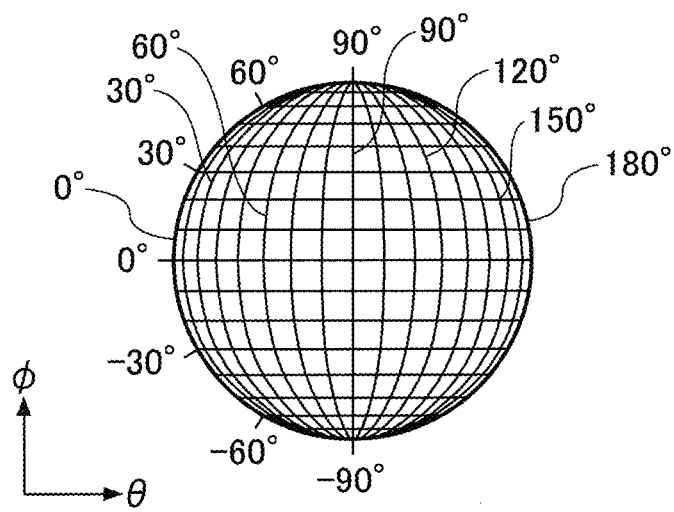
FIG. 10 is a first diagram illustrating an example process of generating an omnidirectional image according to an embodiment of the present invention.
Figure 11:
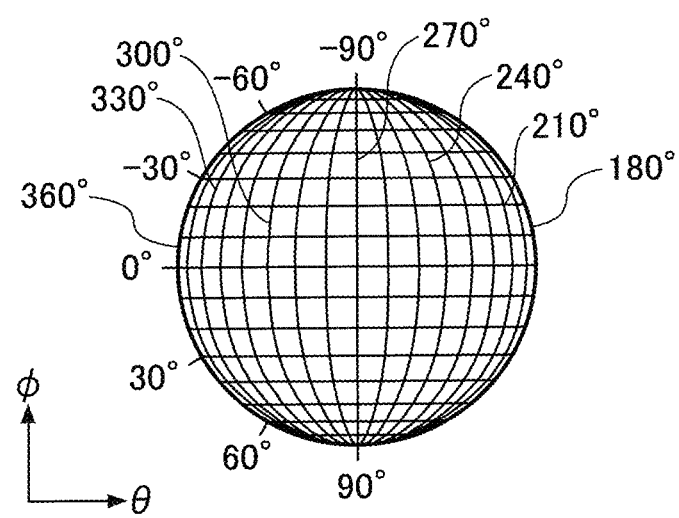
FIG. 11 is a second diagram illustrating the example process of generating an omnidirectional image according to an embodiment of the present invention.

FIGS. 10 to 13 are diagrams illustrating an example process of generating an omnidirectional image according to an embodiment of the present invention. Note that FIG. 10 is a diagram indicating lines connecting positions in the hemispherical image as illustrated in (a) of FIG. 6 where the incidence angles in the horizontal direction and the vertical direction with respect to the optical axis are equal. In the following description, "θ" represents the incident angle in the horizontal direction with respect to the optical axis, and "φ" represents the incident angle in the direction perpendicular to the optical axis. FIG. 11 is a diagram similar to FIG. 10 indicating lines connecting positions in the hemispherical image as illustrated in (b) of FIG. 6 where the incident angles in the horizontal direction and the vertical direction with respect to the optical axis are equal.

Figure 12:
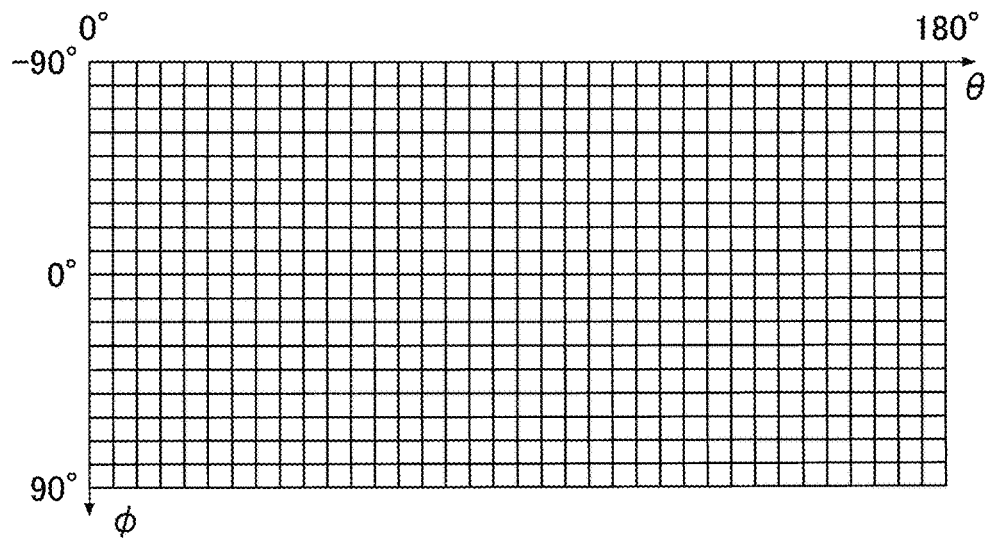
FIG. 12 is a third diagram illustrating the example process of generating an omnidirectional image according to an embodiment of the present invention.
Figure 13:
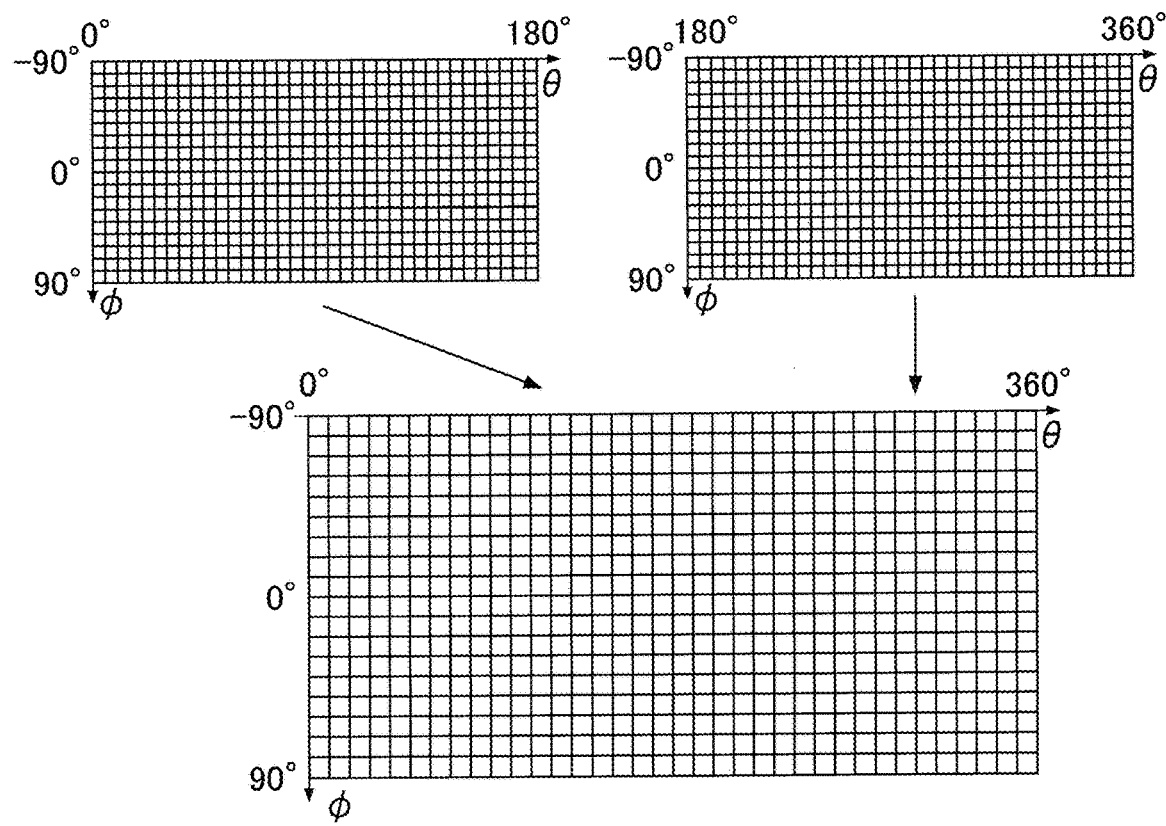
FIG. 13 is a fourth diagram illustrating the example process of generating an omnidirectional image according to an embodiment of the present invention.

FIG. 12 is a diagram illustrating an example image processed using the Mercator projection method. Specifically, the image of FIG. 12 corresponds to an image generated by correlating the images shown in FIG. 10 and FIG. 11 with a pre-generated LUT (LookUp Table) or the like and processing the images using an equirectangular projection method, for example. After the images are processed to be in the state as illustrated in FIG. 12, the processed images of FIG. 10 and FIG. 11 are synthesized by the image capturing apparatus 1 as illustrated in FIG. 13 to generate an omnidirectional image. As described above, the image synthesis process may involve generating an omnidirectional image using two hemispheric images that are in the state as illustrated in FIG. 12. Note that the image synthesis process is not limited to that as illustrated in FIG. 13 which involves simply connecting the hemispheric images that are in the state as illustrated in FIG. 12. For example, when the horizontal center of the omnidirectional image is not θ=180°, in the image synthesis process, the image capturing apparatus may first preprocess the hemispherical image illustrated in (a) of FIG. 6 and arrange the preprocessed image at the center of the omnidirectional image. Then, the image capturing apparatus may divide a preprocessed image of the hemispherical image illustrated in (b) of FIG. 6 so that they may be arranged at left and right portions of the omnidirectional image to be generated and synthesize the hemispherical images to generate the omnidirectional image as illustrated in (c) of FIG. 6.

Note that the process of generating an omnidirectional image is not limited to image processing using the equirectangular projection method. For example, the pixel alignment in the φ direction of the hemispherical image illustrated in FIG. 11 and the pixel alignment in the φ direction of the hemispherical image illustrated in FIG. 10 may be in opposite directions so that their tops and bottoms are inverted with respect to each other, and the pixel alignments of the hemispheric images in the θ direction may be in opposite directions so that their left and right sides are reversed. When the hemispheric images are inverted with respect to each other in this manner, the image capturing apparatus may perform a pre-process of rotating (rolling) the hemispherical image illustrated in FIG. 11 by 180° in order to match the pixel alignment of the hemispherical image in the φ direction and the θ direction with the pixel alignment of the hemispherical image illustrated in FIG. 10.

Also, the process of generating an omnidirectional image may include a distortion correction process for correcting distortions of the hemispherical images illustrated in FIGS. 10 and 11, for example. Further, the process of generating an omnidirectional image may include other processes such as shading correction, gamma correction, white balance, image stabilization (camera shake correction), optical black correction, defective pixel correction, edge enhancement, linear correction, and the like. Note that in the image synthesis process, if the image capturing range of one hemispherical image and the image capturing range of another hemispherical image overlap, for example, correction may be performed using the pixels of an object captured in the overlapping image capturing range so that the hemispherical images can be accurately synthesized.

By implementing the process of generating an omnidirectional image as described above, the image capturing apparatus 1 can generate an omnidirectional image from a plurality of hemispherical images that have been captured. Note that the omnidirectional image may also be generated by some other process. In the following description, an example case where an omnidirectional image is generated by the above-illustrated method will be described.

Referring back to FIG. 9, in step S0702, the smartphone 2 acquires the omnidirectional image generated in step S0701 via a network or the like. In the following, an example case where the smartphone 2 acquires the omnidirectional image illustrated in FIG. 13 will be described.

In step S0703, the smartphone 2 generates an omnidirectional panoramic image using the omnidirectional image acquired in step S0702. Note that the omnidirectional panoramic image may be an image as illustrated in FIG. 14, for example.

Figure 14:
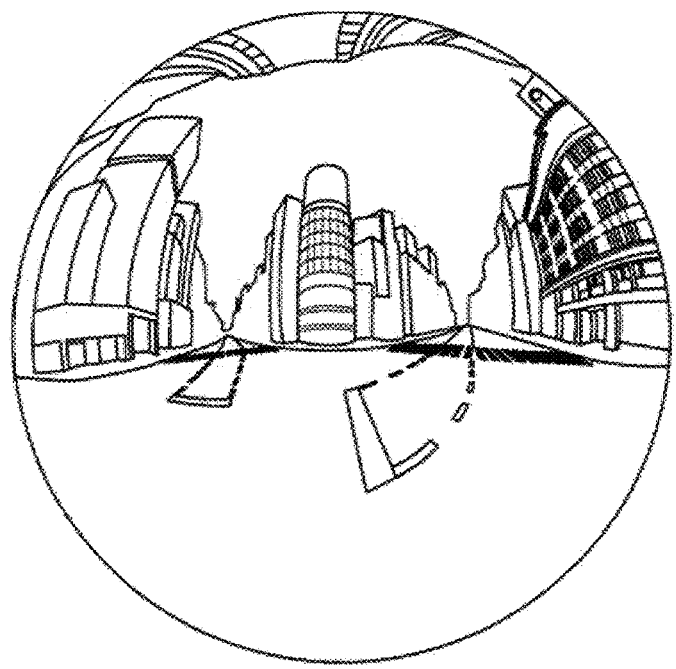
FIG. 14 is a diagram illustrating an example omnidirectional panoramic image according to an embodiment of the present invention.

FIG. 14 is a diagram illustrating an example omnidirectional panoramic image according to an embodiment of the present invention. For example, in step S0703 of FIG. 9, the smartphone 2 may generate the omnidirectional panoramic image of FIG. 14 from the omnidirectional image of FIG. 13 that has been acquired. Note that the omnidirectional panoramic image is an image obtained by arranging an omnidirectional image onto a spherical shape (3D model).

The process of generating an omnidirectional panoramic image may be implemented by an API (Application Programming Interface) such as OpenGL ES (OpenGL (registered trademark) for Embedded Systems), for example. Specifically, for example, the omnidirectional panoramic image may be generated by first dividing pixels of the omnidirectional image into triangles, and then joining the triangles as polygons by connecting vertices P of the triangles (hereinafter referred to as "vertex P" or "vertices P").

Referring back to FIG. 9, in step S0704, the smartphone 2 inputs an operation of the user selecting an image. Specifically, first, in step S0704, the smartphone 2 displays a miniaturized image, such as a thumbnail image, of the omnidirectional panoramic image generated in step S0703, for example. That is, when a plurality of omnidirectional panoramic images are stored in the smartphone 2, the smartphone 2 outputs a list of thumbnail images of the stored omnidirectional panoramic images to prompt the user to select an omnidirectional panoramic image to be processed from among the plurality of omnidirectional panoramic images. Then, in step S0704, the smartphone 2 inputs an operation of the user selecting one thumbnail image from the list of thumbnail images, for example. Note that the omnidirectional panoramic image selected in step S0704 becomes a processing target to be subjected to subsequent processes.

In step S0705, the smartphone 2 generates an initial image based on the omnidirectional panoramic image selected in step S0704. Note that the initial image may be an image as illustrated in FIGS. 15 to 18, for example.

Figure 15:
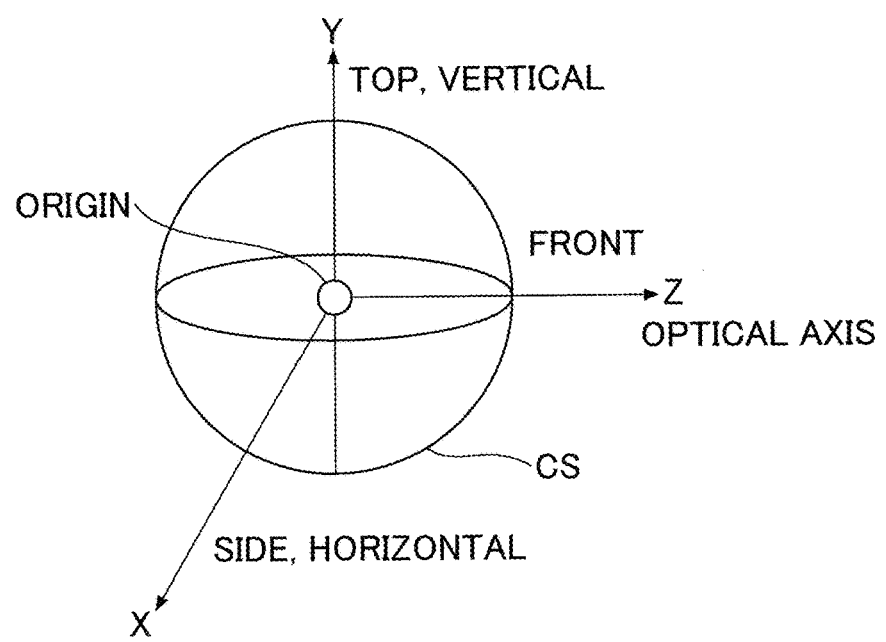
FIG. 15 is a first diagram illustrating an example initial image according to an embodiment of the present invention.

FIGS. 15 to 18 are diagrams illustrating an example of an initial image according to an embodiment of the present invention. Specifically, FIG. 15 is a diagram illustrating a three-dimensional coordinate system for describing an initial image according to an embodiment of the present invention. In the following, the initial image is described with respect to a three-dimensional coordinate system having X, Y, and Z axes as illustrated in FIG. 15. In the present example, the smartphone 2 assumes that a virtual camera 3 is located at the position of the origin and generates images capturing views from the viewpoint of the virtual camera 3. For example, an omnidirectional panoramic image may be expressed as a stereosphere CS in the coordinate system of FIG. 15. Note that the virtual camera 3 corresponds to the viewpoint of the user viewing the omnidirectional panoramic image represented by the stereosphere CS from the origin, namely, the installation position of the virtual camera 3.

Figure 16:
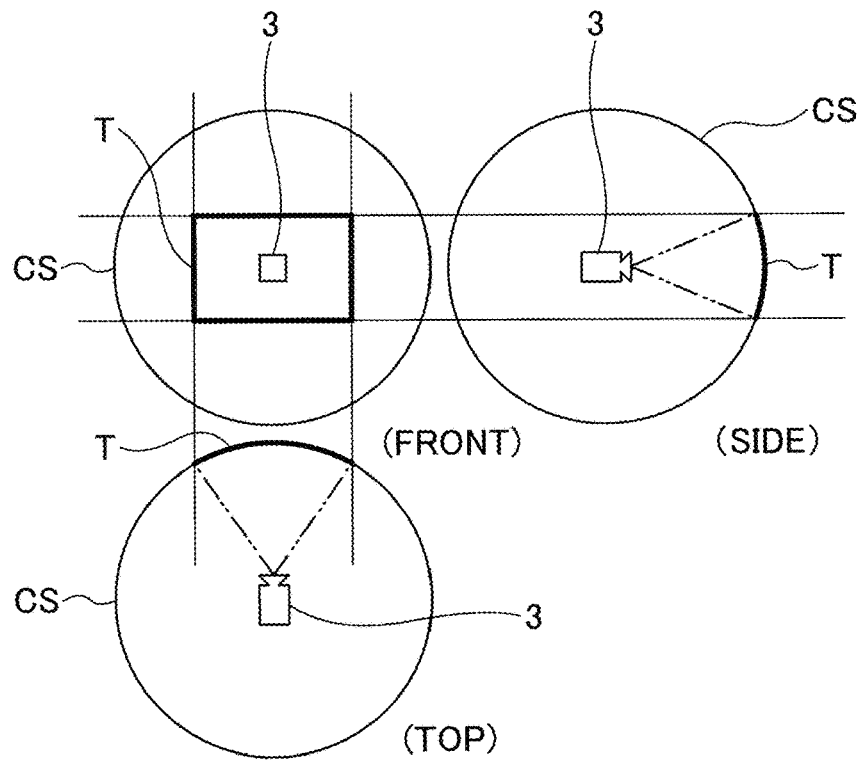
FIG. 16 is a second diagram illustrating the example initial image according to an embodiment of the present invention.

FIG. 16 is a diagram illustrating an example of a predetermined region captured by the virtual camera 3 according to an embodiment of the present invention. Specifically, FIG. 16 depicts the image of FIG. 15 in three views. That is, FIGS. 15 and 16 represent the same state. Thus, in FIG. 16, it is assumed that the virtual camera 3 is installed at the origin.

Figure 17:
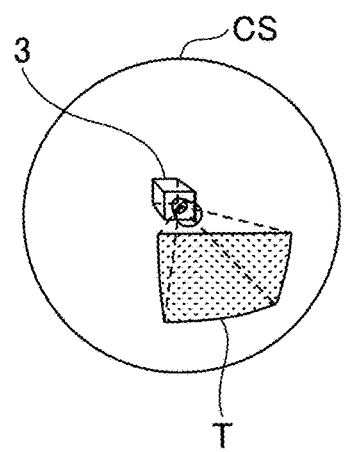
FIG. 17 is a third diagram illustrating the example initial image according to an embodiment of the present invention.

FIG. 17 is a projection view of the example predetermined region captured by the virtual camera 3 according to an embodiment of the present invention. In FIG. 17, the predetermined region T is a region obtained by projecting the viewing angle of the virtual camera 3 onto the stereosphere CS. In the following, an example case in which the smartphone 2 generates an image with respect to the predetermined region T will be described. That is, the smartphone 2 generates an image based on the predetermined region T. The predetermined region T may be determined as follows, for example.

Figure 18:
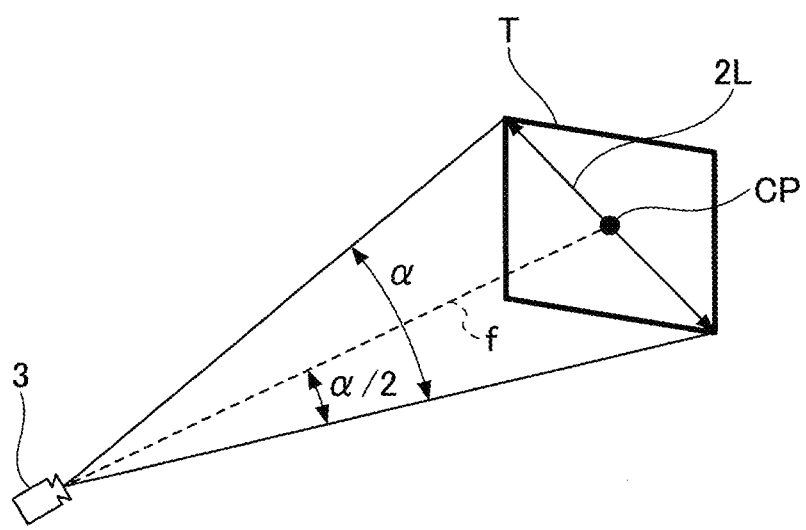
FIG. 18 is a fourth diagram illustrating the example initial image according to an embodiment of the present invention.

FIG. 18 is a diagram illustrating an example of information for determining the predetermined region T captured by the virtual camera 3 according to an embodiment of the present invention. In the present example, the predetermined region T is determined by predetermined region information $(x, y, \alpha)$, for example. Specifically, as illustrated in FIG. 18, the viewing angle $\alpha$ is an angle indicating the viewing angle of the virtual camera 3. Note that $(x, y)$ of the predetermined region information represents the coordinates of a center point CP of the predetermined region T with respect to a diagonal line field angle 2L in the predetermined region T indicated by the viewing angle $\alpha$.

The distance from the virtual camera 3 to the center point CP can be expressed by the following equation (1).

$$f = \tan(\alpha/2) \quad (1)$$

The initial image is an image generated based on the predetermined region T, which is determined based on a so-called initial setting that is set up in advance. For example, the initial setting may be set up as $(x, y, \alpha) = (0, 0, 34)$ by the user or the like.

When an operation of changing the field angle, namely, a so-called zoom operation, is input, the smartphone 2 performs a zooming process as described below. The zooming process is a process of generating an enlarged or reduced image of a predetermined region based on an operation input by the user. In the following description, an operation amount input by a zoom operation is referred to as "change amount dz". First, when a zoom operation is input, the smartphone 2 acquires the change amount dz based on the operation that has been input by the user. Then, the smartphone 2 calculates the viewing angle $\alpha$ based on the change amount dz using the following equation (2).

$$\alpha = \alpha 0 + m \times dz \quad (2)$$

In the above equation (2), "$\alpha$" denotes the viewing angle $\alpha$ of the virtual camera 3 shown in FIG. 18. "M" in the above equation (2) denotes a coefficient for adjusting the zoom amount and is a value set up in advance by the user. Further, "$\alpha 0$" in the above equation (2) denotes the viewing angle $\alpha$ of the virtual camera 3 in the initial state, namely, the viewing angle $\alpha$ in the initial image generated in step S0705.

Next, the smartphone 2 determines the range of the predetermined region T shown in FIG. 18 using the viewing angle $\alpha$ calculated based on the above equation (2) in a projection matrix.

Note that when the user further performs a zoom operation with a change amount dz2, the smartphone 2 calculates the following equation (3).

$$\alpha = \alpha 0 + m \times (dz + dz2) \quad (3)$$

As can be appreciated from the above equation (3), the viewing angle $\alpha$ is calculated based on the sum of the change amounts of the respective zoom operations. By first calculating the viewing angle $\alpha$ as described above, the smartphone 2 can maintain consistent operability even when multiple zoom operations are performed.

Note that the zooming process is not limited to the process based on the above equation (2) or (3). For example, the zooming process may be implemented based on a combination of a change in the viewing angle $\alpha$ and a viewpoint position of the virtual camera 3 (FIG. 16). Specifically, a zooming process as illustrated in FIG. 19 may be performed, for example.

Figure 19:
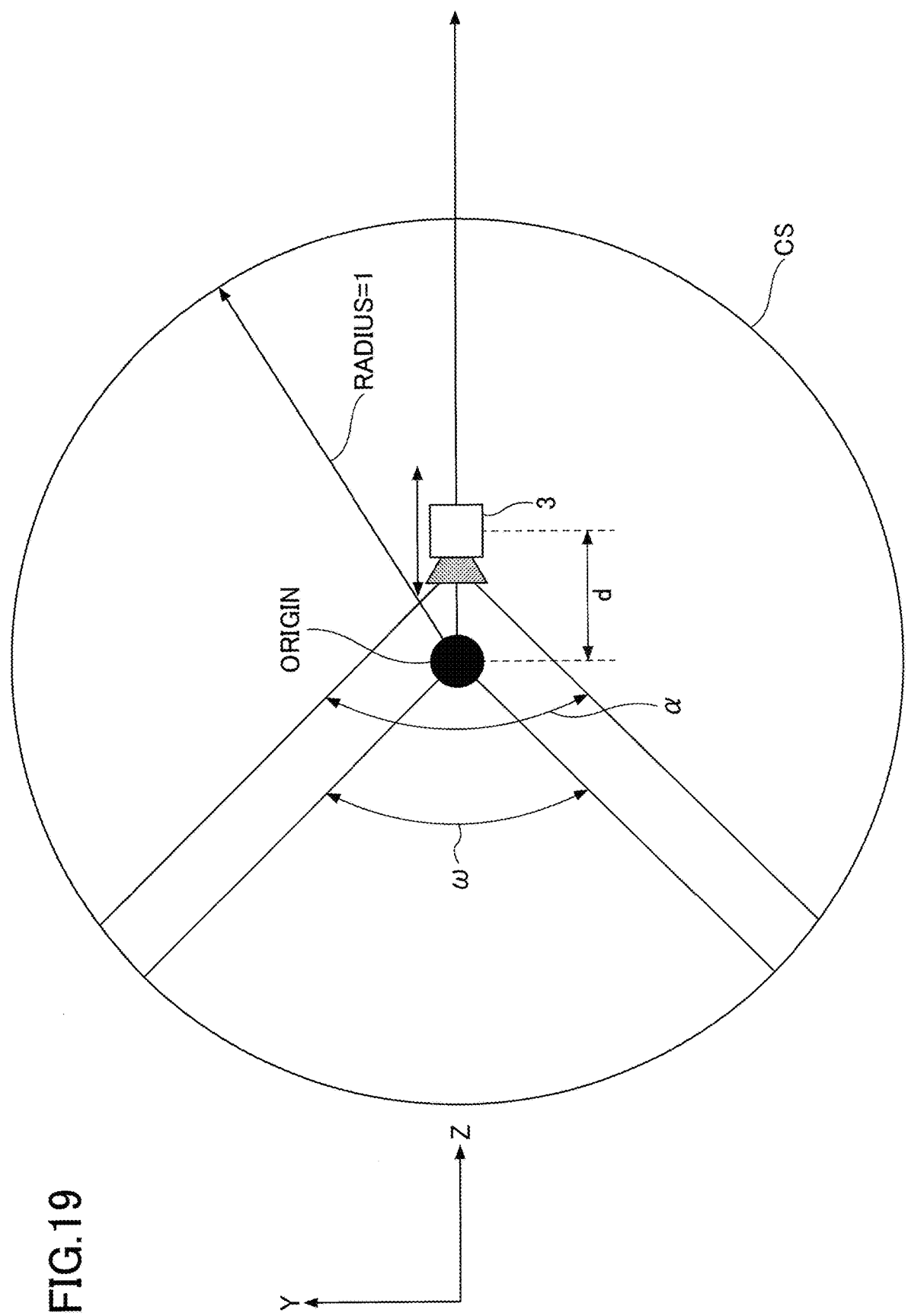
FIG. 19 is a diagram illustrating an alternative zooming process according to an embodiment of the present invention.

FIG. 19 is a diagram illustrating an example of an alternative zooming process according to an embodiment of the present invention. Note that FIG. 19 is a model diagram describing the alternative zooming process. Note that the stereosphere CS in FIG. 19 is substantially the same as the stereosphere CS illustrated in FIG. 15. Further, in the following, an example case where the radius of the stereosphere CS is "1" will be described.

First, the illustrated origin is the initial position of the virtual camera 3. Then, the virtual camera 3 changes its position by moving along the optical axis, namely, the Z axis illustrated in FIG. 19. A moving amount d of the virtual camera 3 is indicated by the distance from the origin. For example, when the virtual camera 3 is positioned at the origin, namely, the initial position, the moving amount d is "0".

A field angle ω indicates the range of the predetermined region T as illustrated in FIG. 16 based on the moving amount d and the viewing angle α of the virtual camera 3. For example, the field angle ω illustrated in FIG. 19 corresponds to the field angle when the virtual camera 3 is positioned at the origin, namely, when d=0. When the virtual camera 3 is positioned at the origin, namely, when d=0, the field angle ω and the viewing angle α coincide. In contrast, when the virtual camera 3 moves away from the origin, namely, when the value of d is greater than "0" (d>0), the field angle ω and the viewing angle α are different. The alternative zooming process may be a process of changing the field angle ω as illustrated in FIG. 20.

FIG. 20 illustrates an example description table 4 describing the alternative zooming process according to an embodiment of the present invention. Note that the description table 4 describes an example case where the field angle ω is in the range from 60° to 300°. As indicated in the description table 4, the smartphone 2 determines which parameter from among the viewing angle α and the moving amount d of the virtual camera 3 is to be preferentially changed based on a zoom designation value ZP.

Note that in the description table 4, "range" corresponds to a range determined based on the zoom designation value ZP. "Output magnification" corresponds to an output magnification of an image calculated based on an image parameter determined by the alternative zooming process. Further, "zoom designation value ZP" corresponds to a value designated according to the field angle to be output.

As described above, the alternative zooming process involves changing the process of determining the moving amount d and the viewing angle α based on the zoom designation value ZP. Specifically, as indicated in the description table 4, in the alternative zooming process, one method out of four methods as indicated is determined based on the zoom designation value ZP. In the present example, the ranges of the zoom designation value ZP are divided into four ranges of "A~B", "B~C", "C~D", and "D~E".

"Field angle ω" indicates the field angle ω corresponding to an image parameter determined by the alternative zooming process. Further, "parameter to be changed" indicates the parameter to be changed in a corresponding method out of the four methods based on the zoom designation value ZP. "Note" indicates a note on the "parameter to be changed".

In the description table 4, "viewWH" is a value indicating the width or the height of an output region. For example, if the output region is horizontally long (landscape), "viewWH" indicates the width of the output region. On the other hand, if the output region is vertically long (portrait), "viewWH" indicates the height of the output region. That is, "viewWH" is a value indicating the size of the output region in the longer direction.

Also, in the description table 4, "imgWH" is a value indicating the width or the height of an output image. For example, if the output region is horizontally long, "imgWH" indicates the width of the output image. On the other hand, if the output region is vertically long, "imgWH" indicates the height of the output image. That is, "imgWH" is a value indicating the size of the output image in the longer direction.

Further, in the description table 4, "imgDeg" is a value indicating the angle of the display range of the output image. Specifically, when indicating the width of the output image, "imgDeg" is 360°. On the other hand, when indicating the height of the output image, "imgDeg" is 180°.

FIGS. 21 to 25 are diagrams illustrating examples of the "range" in the alternative zooming process according to an embodiment of the present invention. The illustrated examples each indicate the "range" displayed by an image and an example of the corresponding image when the above-described alternative zooming process is performed. In the following, a so-called zoom-out process will be described using the illustrated examples. The images on the left side of FIGS. 21 to 25 illustrate examples of images to be output. On the other hand, the diagrams on the right side of FIGS. 21 to 25 are model diagrams similar to FIG. 19 representing example states of the virtual camera 3 at the time the corresponding images are output.

Specifically, FIG. 21 illustrates an example of an image to be output and the "range" when a value within the range "A~B" listed under "range" in the description table 4 of FIG. 20 is input as the zoom designation value ZP. As can be appreciated, when a zoom designation value ZP that is within the range "A~B" is input, the viewing angle α of the virtual camera 3 (FIG. 19) is fixed to α=60°, for example. Further, when the zoom designation value ZP is within the range "A~B" and the moving amount d of the virtual camera 3 is changed while the viewing angle α is fixed as illustrated in FIG. 21, the field angel ω may change in the manner described below. In the following, an example case where the moving amount d of the virtual camera 3 is increased while the viewing angle α is fixed will be described. In this case, the field angle ω expands. That is, when the zoom designation value ZP is within the range "A~B", the viewing angle α is fixed, and the moving amount d of the virtual camera 3 is increased, a zoom-out process may be implemented. Note that when the zoom designation value ZP is within the range "A~B", the moving amount d of the virtual camera 3 is in the range from "0" to the radius of the stereosphere CS. Specifically, in examples illustrated in FIGS. 21 to 25, the radius of the stereosphere CS is "1", and as such, the moving amount d of the virtual camera 3 is a value within the range "0~1". Further, the moving amount d of the virtual camera 3 is a value corresponding to the zoom designation value ZP.

FIG. 22 illustrates an example of an image to be output and the "range" when a value within the range "B~C" listed under "range" in the description table 4 (FIG. 20) is input as the zoom designation value ZP. Note that a zoom designation value ZP within the range "B~C" is a greater value than a zoom designation value ZP within the range "A~B". In the present example, it is assumed that the zoom designation value ZP is within the range "B~C" and the moving amount d of the virtual camera 3 is fixed to a value corresponding to a distance at which the virtual camera 3 is positioned at the outer edge of the stereosphere CS. In this case, as illustrated in FIG. 22, the moving amount d of the virtual camera 3 is fixed to "1" corresponding to the radius of the stereosphere CS. Further, when the viewing angle α is changed while the zoom designation value ZP is within the range "B~C" and the moving amount d of the virtual camera 3 is fixed, the field angle ω may change in the manner described below. In the following, an example case where the viewing angle α is increased while the moving distance d of the virtual camera 3 is fixed will be described. In this case, the field angle ω expands from the state as illustrated in FIG. 21 to the state as illustrated in FIG. 22, for example. That is, when the viewing angle α is increased while the zoom designation value ZP is within the range "B~C" and the moving amount d of the virtual camera 3 is fixed, a zoom-out process may be implemented. Note that when the zoom designation value ZP is within the range "B~C", the viewing angle α is calculated as "ω/2". Also, when the zoom designation value ZP is within the range "B~C", the range of the viewing angle α is changed to "60°~120°" from "60°" corresponding to the fixed value when the zoom designation value ZP is within the range "A~B".

When the zoom designation value ZP is within the range "A~B" or "B~C", the field angle ω coincides with the zoom designation value ZP. Also, when the zoom designation value ZP is within the range "A~B" or "B~C", the value of the field angle ω increases as the value of the parameter to be changed increases.

FIG. 23 illustrates an example of an image to be output and the "range" when a value within the range "C~D" listed under "range" in the description table 4 (FIG. 20) is input as the zoom designation value ZP. Note that a zoom designation value ZP within the range "C~D" is a greater value than a zoom designation value ZP within the range "B~C". In the present example, it is assumed that the zoom designation value ZP is within the range "C~D" and the viewing angle α is fixed to α=120°, for example. Further, when the zoom designation value ZP is within the range "C~D" and the moving amount d of the virtual camera 3 is changed while the viewing angle α is fixed as illustrated in FIG. 23, the field angle ω may change in the manner described below. In the following, an example case where the moving amount d of the virtual camera 3 is increased while the viewing angle α is fixed will be described. In this case, the field angle ω expands. Also, the moving amount d of the virtual camera 3 is calculated using the equation based on the zoom designation value ZP indicated in the description table 4 (FIG. 20). Note that when the zoom designation value ZP is within the range "C~D", the moving amount d of the virtual camera 3 may be changed (increased) up to a maximum display distance dmax1. Note that the maximum display distance dmax1 corresponds to a distance at which display of the stereosphere CS can be maximized in the output region of the smartphone 2 (FIG. 1). Note, also, that the output region may correspond to the size of a screen on which the smartphone 2 outputs an image, for example. Further, the maximum display distance dmax1 may correspond to the state as illustrated in FIG. 24, for example. Further, the maximum display distance dmax1 can be calculated by the following equation (4).

$$d\max1 = \frac{1}{\sin\left\{atan\left[\tan\left(\frac{\omega}{2}\right) * \frac{(viewW^2 + viewH^2)^{\frac{1}{2}}}{viewW}\right]\right\}} \quad (4)$$

In the above equation (4), "viewW" represents a value indicating the width of the output region of the smartphone 2. Also, "viewH" in the above equation (4) represents a value indicating the height of the output region of the smartphone 2. Note that the same descriptions will be used hereinafter. In this way, the maximum display distance dmax1 can calculated based on the dimensions of the output region of the smartphone 2, namely, the values of "viewW" and "viewH", and the like.

Figure 25:
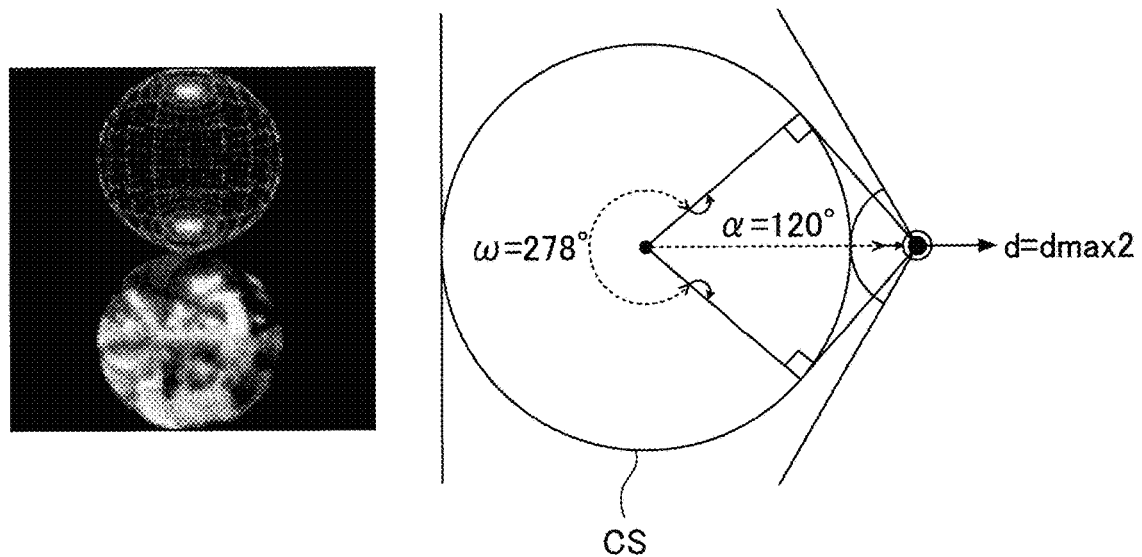
FIG. 25 is a fifth diagram illustrating an example "range" of the alternative zooming process according to an embodiment of the present invention.

FIG. 24 illustrates an example of an image to be output and the "range" when a value within the range "D~E" listed under "range" in the description table 4 (FIG. 20) is input as the zoom designation value ZP. Note that a zoom designation value ZP within the range "D~E" is a greater value than a zoom designation value ZP within the range "C~D". In the present example, it is assumed that the zoom designation value ZP is within the range "D~E" and the viewing angle α is fixed to α=120°, for example. It is further assumed below that the zoom designation value ZP is within the range "D~E" and the moving amount d of the virtual camera 3 is changed while the viewing angle α is fixed as illustrated in FIG. 24. Note that the moving amount d of the virtual camera 3 can be changed (increased) up to an upper limit display distance dmax2. The upper limit display distance dmax2 corresponds to a distance at which the stereosphere CS is inscribed in the output region of the smartphone 2. Specifically, the upper limit display distance dmax2 can be calculated by the following equation (5). Note that the upper limit display distance dmax2 may correspond to the state as illustrated in FIG. 25, for example.

$$d\max2 = \frac{1}{\sin\left\{atan\left[\tan\left(\frac{\omega}{2}\right) * \frac{viewH}{viewW}\right]\right\}} \quad (5)$$

As indicated by the above equation (5), the upper limit display distance dmax2 can be calculated based on the values of "viewW" and "viewH" corresponding to the dimensions of the output region of the smartphone 2. Also, the upper limit display distance dmax2 indicates a maximum range that can be output by the smartphone 2, namely, an upper limit value up to which the moving amount d of the virtual camera 3 can be increased. Note that the smartphone 2 may limit an input value so that the zoom designation value ZP falls within the range described in the description table 4 (FIG. 20), namely, so that the moving amount d of the virtual camera 3 does not exceed the upper limit display distance dmax2. By imposing such a limitation, the smartphone 2 may be able to fit an output image to its screen corresponding to the output region or output an image to the user with a predetermined output magnification in implementing a zoom-out process. By implementing the zooming process of "D~E", the smartphone 2 can make the user recognize that the image output to the user corresponds to an omnidirectional panoramic image.

Note that when the zoom designation value ZP is in the range "C~D" or "D~E", the field angle ω takes a value that is different from the zoom designation value ZP. Also, although continuous value ranges of the field angle ω are indicated in the description table 4 and FIGS. 21 to 25, the field angle ω does not necessarily have to increase uniformly as the zoom designation value ZP designates zoom out to a wider angle. That is, for example, when the zoom designation value ZP is in the range "C~D", the field angle ω increases as the moving amount d of the virtual camera 3 increases. On the other hand, when the zoom designation value ZP is in the range "D~E", the field angle ω decreases as the moving amount d of the virtual camera 3 increases. Note that the decrease in the field angle ω with respect to the moving amount d of the virtual camera 3 when the zoom designation value ZP is in the range "D~E" occurs because the outer region of the stereosphere CS is reflected in the output image. As described above, when the zoom designation value ZP designates a wide viewing range greater than or equal to 240°, the smartphone 2 can change the moving amount d of the virtual camera 3 to output an image that appears less awkward to the user and also change the field angle ω.

Also, when the zoom designation value ZP is changed in a wider angle direction, the field angle ω is also widened in most cases. When the field angle ω is widened as described above, the smartphone 2 fixes the viewing angle α of the virtual camera 3 and increases the moving amount d of the virtual camera 3. By fixing the viewing angle α of the virtual camera 3, the smartphone 2 can reduce an increase in the viewing angle α of the virtual camera 3. Further, by reducing an increase in the viewing angle α of the virtual camera 3, the smartphone 2 can output an image with less distortion to the user.

When the viewing angle α of the virtual camera 3 is fixed and the smartphone 2 increases the moving amount d of the virtual camera 3, namely, moves the virtual camera 3 in a direction away from its original position, the smartphone 2 may impart a sense of opening from a wider angle display. Also, because a movement of moving the virtual camera 3 in the direction away from its original position is similar to a movement that causes a human being to recognize a wider range, the smartphone 2 can implement a zoom-out process that appears less awkward by moving the virtual camera 3 in the direction away from its original position.

When the zoom designation value ZP is in the range "D~E", the field angle ω decreases as the zoom designation value ZP changes in the wider angle direction. When the zoom designation value ZP is in the range "D~E" as described above, the smartphone 2 can impart to the user a sense of moving away from the stereosphere CS by decreasing the field angle ω. By imparting a sense of moving away from the stereosphere CS, the smartphone 2 can output an image that appears less awkward to the user.

By implementing the alternative zooming process as described above with reference to the description table 4 (FIG. 20), the smartphone 2 can output an image that appears less awkward to the user.

Note that the smartphone 2 is not limited to implementing a zooming process by changing only the moving amount d of the virtual camera 3 or the viewing angle α as described in the description table 4. That is, in the description table 4, the smartphone 2 may merely be configured to preferentially change the movement amount d of the virtual camera 3 or the viewing angle α. For example, for adjustment purposes, the smartphone 2 may change the fixed value to a sufficiently small value. Also, the smartphone 2 is not limited to performing a zoom-out process. For example, the smartphone 2 may perform a zoom-in process.

Figure 26:
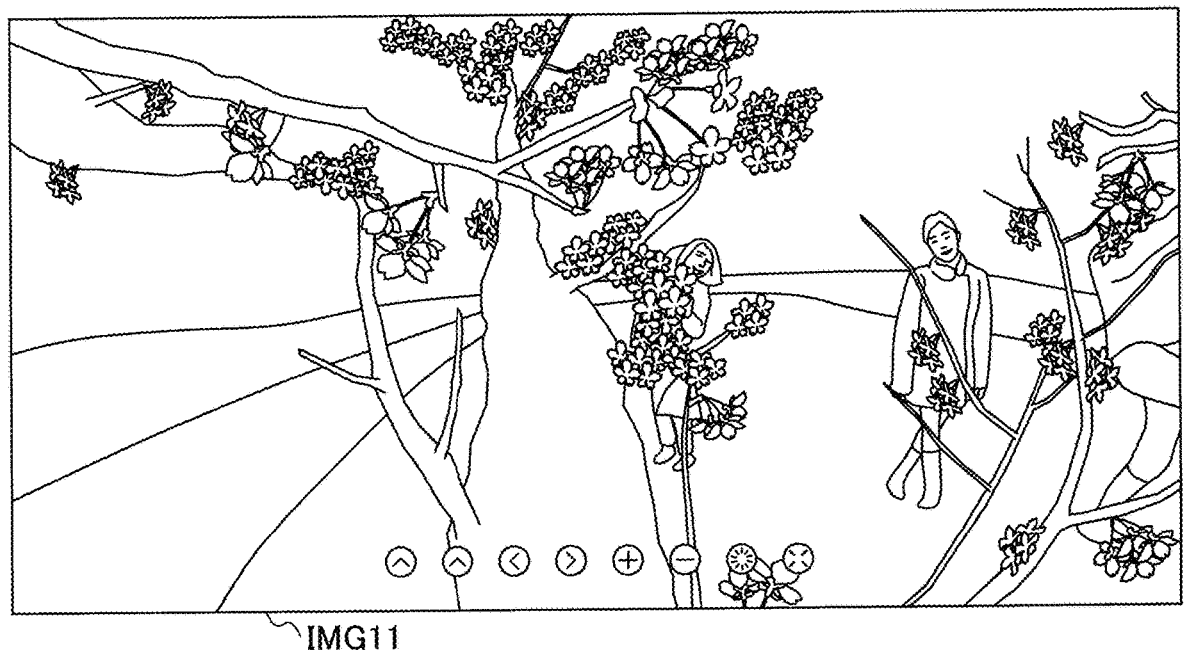
FIG. 26 is a diagram illustrating an example first image according to an embodiment of the present invention.

In the following, it is assumed that an omnidirectional image as illustrated in FIG. 26 is used as an example of a first image.

FIG. 26 illustrates an example of a first image according to an embodiment of the present invention. For example, a first image IMG11 as illustrated in FIG. 26 may be selected by a user. Note that in the example described below, it is assumed that the first image is a still image. However, the first image may also be a moving image.

Referring back to FIG. 9, in step S0706, the smartphone 2 inputs an operation of the user selecting a second image. In the following description, "second image" refers to an image to be newly added to the omnidirectional image corresponding to an example of the first image. For example, the user may input to the smartphone 2 an operation of adding additional information such as a hashtag to the first image. In turn, the smartphone 2 may specify an image corresponding to the hashtag as a corresponding second image to be added to the first image. For example, an image as illustrated in FIG. 27 may be an example of the second image.

Figure 27:
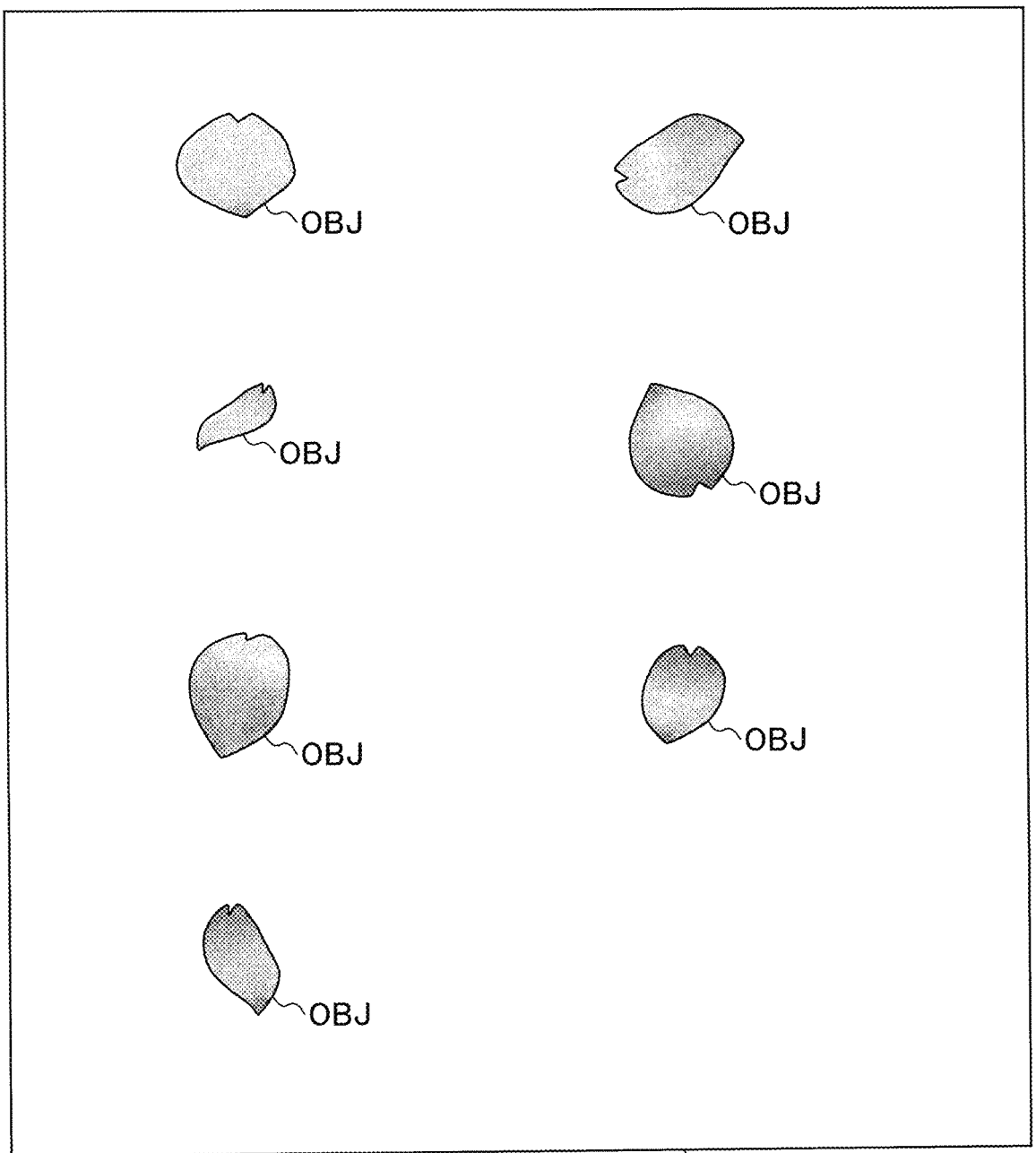
FIG. 27 is a diagram illustrating an example second image according to an embodiment of the present invention.

FIG. 27 illustrates an example of a second image according to an embodiment of the present invention. For example, when a hashtag such as "cherry" is input, the smartphone specifies the second image corresponding to the input hashtag. Specifically, as illustrated in FIG. 27, the corresponding second image IMG21 may be an image indicating a "petal" of the same type of flower indicated in the first image. In the following, an object indicated in the second image is referred to as "object OBJ". In the present example, it is assumed that cherry blossoms are included in the first image as an image corresponding to the hashtag "cherry", namely, an object of the same type as that specified by the hashtag. As described above, the second image may be an image corresponding to a part of the same type of object indicated in the first image (e.g., a cherry blossom petal) or an image corresponding to the entirety of the same type of object (e.g., cherry blossom petals, leaves, and branches). In the following, an example where the input hashtag is "cherry", and the second image is a "petal" will be described. However, embodiments of the present invention are not limited thereto. For example, when the input hashtag is "rain", the second image may correspond to an image of a "water droplet" corresponding to rain, and when the input hashtag is "snow", the second image may correspond to an image of a "snowflake". Note that the second image may be an image indicating one object. Also, in some embodiments, a plurality of second images may be selected.

For example, data indicating the second image IMG21 may be input to the smartphone 2 in advance. Note that the data indicating the second image IMG21 may be downloaded by the smartphone 2 from a server or the like that has the second image registered therein or may be searched using a search engine based on the hashtag and downloaded.

In a case where the smartphone 2 includes a recognizing unit that recognizes an image, the smartphone 2 may recognize the image included in the first image and specify the corresponding second image. For example, the first image IMG11 of FIG. 26 includes an image indicating a "petal". Thus, when an image recognition process is performed on the first image IMG11, the smartphone 2 may recognize the "petal" captured in the first image IMG11. Based on the recognition result of the recognizing unit, the smartphone 2 may specify the second image IMG21 indicating the same content as the "petal" image captured in the first image IMG11 of FIG. 26 from among one or more second images input to the smartphone 2 in advance. Also, even if the second image is not identical to the image included in the first image, an image indicating content similar to the image included in the first image may be specified as illustrated in FIG. 27, for example.

Note that the second image may be described by 3D model data in the JSON (JavaScript (registered trademark) Object Notation) format and data indicating the color, pattern, and other attributes of the object OBJ, for example. The second image may also be described in some other format.

Referring back to FIG. 9, in step S0707, the smartphone 2 arranges the second image onto the 3D model having the first image arranged thereon, namely, the stereosphere CS (FIG. 15) or the like. That is, the first image is first arranged on the 3D model by the smartphone 2 after which the object OBJ (FIG. 27) indicated by the second image is further added onto the 3D model.

In step S0708, the smartphone 2 generates an output image based on the 3D model having the second image arranged thereon obtained in step S0707. Specifically, as in the case of generating the initial image as illustrated in FIGS. 15 to 18, the smartphone 2 may output an image of a predetermined region of the 3D model having the second image arranged thereon as an output image. For example, the output image may be an image as illustrated in FIG. 28.

FIG. 28 illustrates an example of an output image according to an embodiment of the present invention. For example, the smartphone 2 may output a first output image IMGOUT1 as a first frame and then a second output image IMGOUT 2 as a second frame. The first output image IMGOUT1 and the second output image IMGOUT2 differ from the first image as illustrated in FIG. 26 in that they have a plurality of objects OBJ indicated by the second image, namely, "petals" added thereto. Note that the object OBJ indicated by the second image may be duplicated such that the number of the objects OBJ output may be greater than the number of second images input. Also, the objects may be output at different angles and different positions in the output image.

As can be appreciated from the first output image IMGOUT1 and the second output image IMGOUT2 illustrated in FIG. 28, the smartphone 2 outputs the objects OBJ so that they move in the direction of gravity (first direction DR1 in the Y-axis direction in FIG. 28) from one frame to the next frame, for example. In the illustrated example, the smartphone 2 outputs the objects OBJ corresponding to "petals" so that they appear to be falling in the first direction DR1 by gravity. That is, the smartphone 2 can newly add the second image onto the first image as illustrated in FIG. 26 to thereby produce an enhanced presentation effect of "petals" fluttering. Note that the enhanced presentation effect is not limited to the illustrated example. For example, an object different from that indicated by the second image of FIG. 27 may be output to produce some other enhanced presentation effect.

Because the output image is generated based on the 3D model, the object OBJ is output so as to move in a predetermined direction. Specifically, in the example illustrated in FIG. 28, the second image may be output so as to move in the manner illustrated in FIG. 29, for example.

Figure 29:
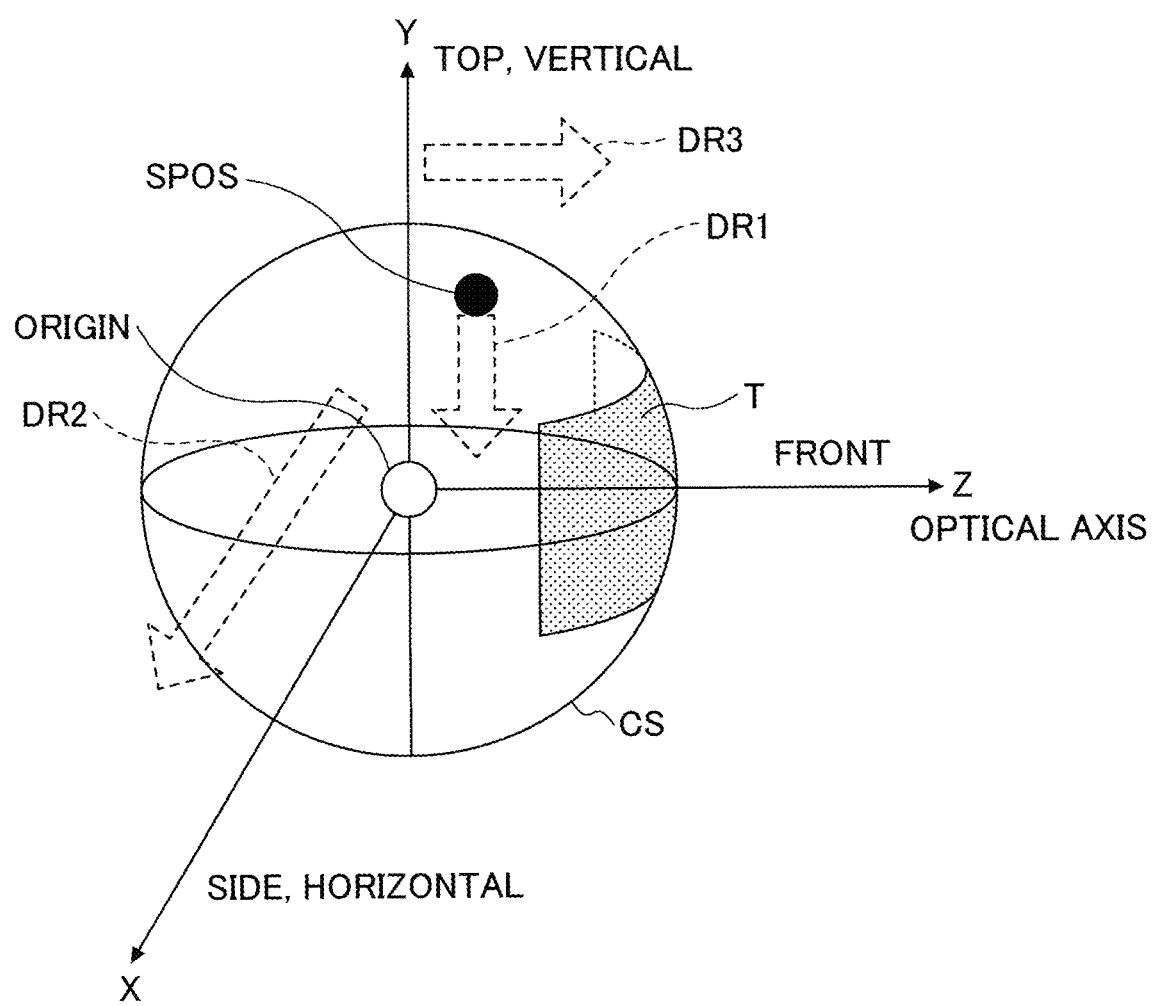
FIG. 29 is a diagram illustrating an example movement of a second image in an output image according to an embodiment of the present invention.

FIG. 29 is a diagram illustrating an example movement of the second image in the output image according to an embodiment of the present invention. FIG. 29 is a 3D model diagram illustrating movement of the second image, namely, movement of the object in the output image of FIG. 28. As illustrated in FIG. 29, when a first image is arranged on a stereosphere CS corresponding to an example of a 3D model, the smartphone 2 outputs an image indicating a predetermined region T specified by a parameter or the like designated by the user. That is, the image output based on the predetermined region T corresponds to the output image. Further, in the example of FIG. 28, output images are generated such that the object OBJ moves in the first direction DR1 in FIG. 29.

Note that the direction in which the object moves, the position at which the object starts to be output, the speed at which the object moves, or a combination thereof may be specified by the user or the like. In the example of FIG. 28, the moving direction of the object is in the first direction DR1, but movement of the object is not limited to the first direction DR1.

For example, the direction in which the object moves may be in a lateral direction (second direction DR2 in the X-axis direction in FIG. 29), a depth direction (third direction DR3 in the Z-axis direction in FIG. 29), or a combination thereof.

Also, in the present example, the position at which the object starts being output may be designated by inputting a Y coordinate value, for example. Specifically, as illustrated in FIG. 29, a coordinate value indicating a start position SPOS may be input, for example. When the start position SPOS is determined, the object is output so as to move from the start position SPOS toward the first direction DR1.

Further, the moving speed of the object may be designated by inputting a coordinate number indicating a distance the object is to move per frame, for example. In this way, the user can set up details on how the object is to move over a sequence of frames of the first image.

Further, because the output image is generated based on a 3D model, even if so-called viewpoint conversion is performed so that the predetermined region T as illustrated in FIG. 29 is changed to a different region, the object OBJ is output so as to move in a corresponding predetermined direction. Specifically, for example, an image as illustrated in FIG. 30 may be output as an output image after viewpoint conversion.

Figure 30:
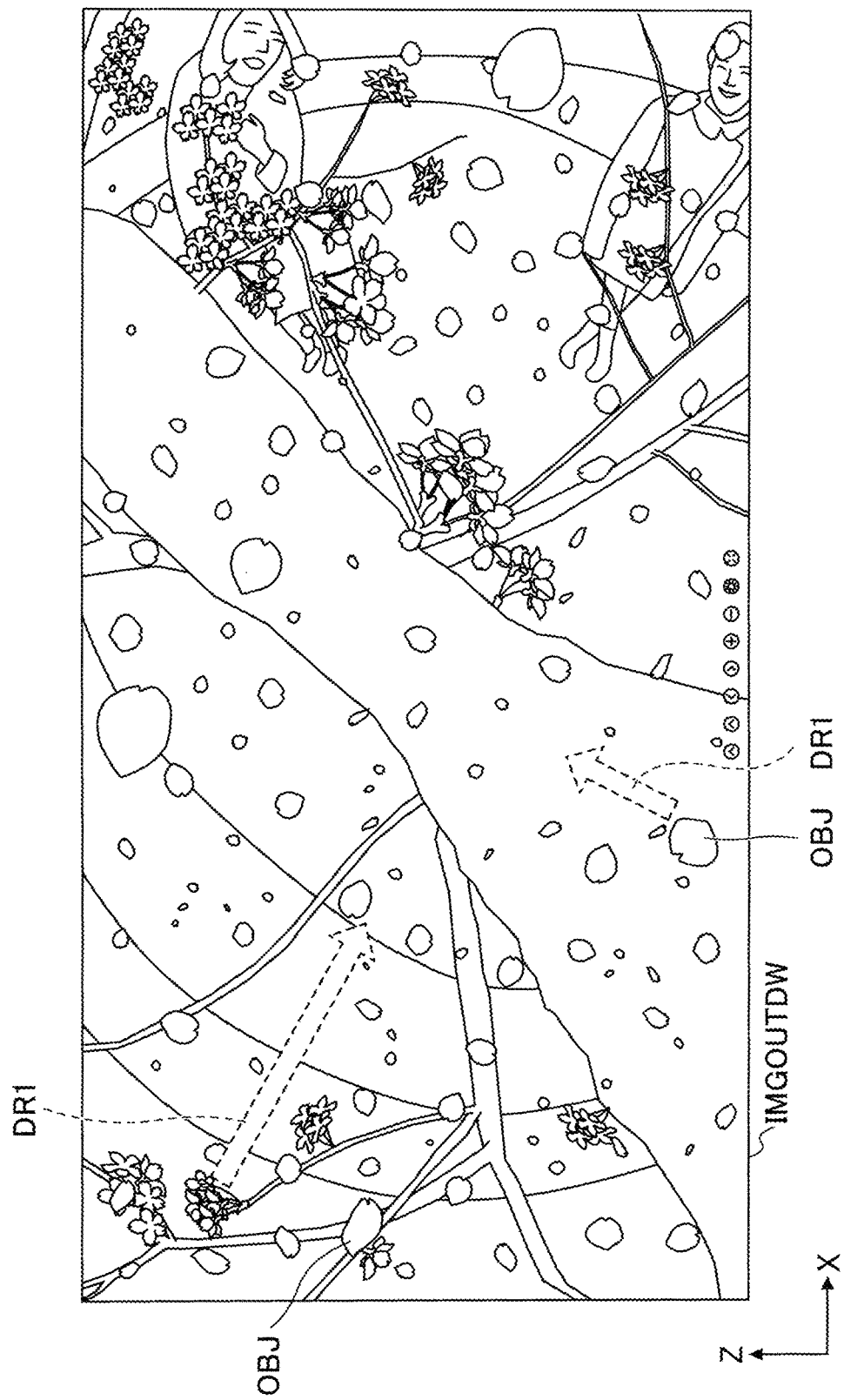
FIG. 30 is a diagram illustrating an example output image with a looking-down viewpoint according to an embodiment of the present invention.

FIG. 30 illustrates an example output image with a looking-down viewpoint according to an embodiment of the present invention. That is, FIG. 30 illustrates an output image IMGOUTDW as an example image output when the predetermined region T corresponding to the region to be output is changed to a different region from that illustrated in FIG. 29. More specifically, the output image IMGOUTDW is an example image output as a result of performing viewpoint conversion of changing the viewpoint of the output image to a so-called looking-down viewpoint corresponding to a viewpoint when looking from the top toward the bottom in the Y axis direction. In FIG. 30, the direction in which the object OBJ moves is in the first direction DR1 as in the case illustrated in FIG. 28.

In the output image IMGOUTDW, even if the moving direction of the object OBJ is set up to be the same as that in FIG. 28, for example, the object OBJ is displayed within the screen in a manner different from that in FIG. 28. Specifically, in the output image IMGOUTDW of FIG. 30, the object OBJ is output from the outer side of the screen toward the center and is gradually reduced in size. That is, the object OBJ is output so as to move from the front toward the back in the depth direction of the screen. That is, even when the viewpoint is changed to a looking-down viewpoint, the object OBJ corresponding to a "petal" is output so as to appear as if it is falling in the first direction DR1 by gravity. As described above, when an output image is generated based on a 3D model, even if a viewpoint conversion is performed, the smartphone 2 can output a second image so that it moves in a corresponding predetermined direction. Specifically, in the example illustrated in FIG. 30, the second image may be output so as to move in the manner as illustrated in FIG. 31, for example.

Figure 31:
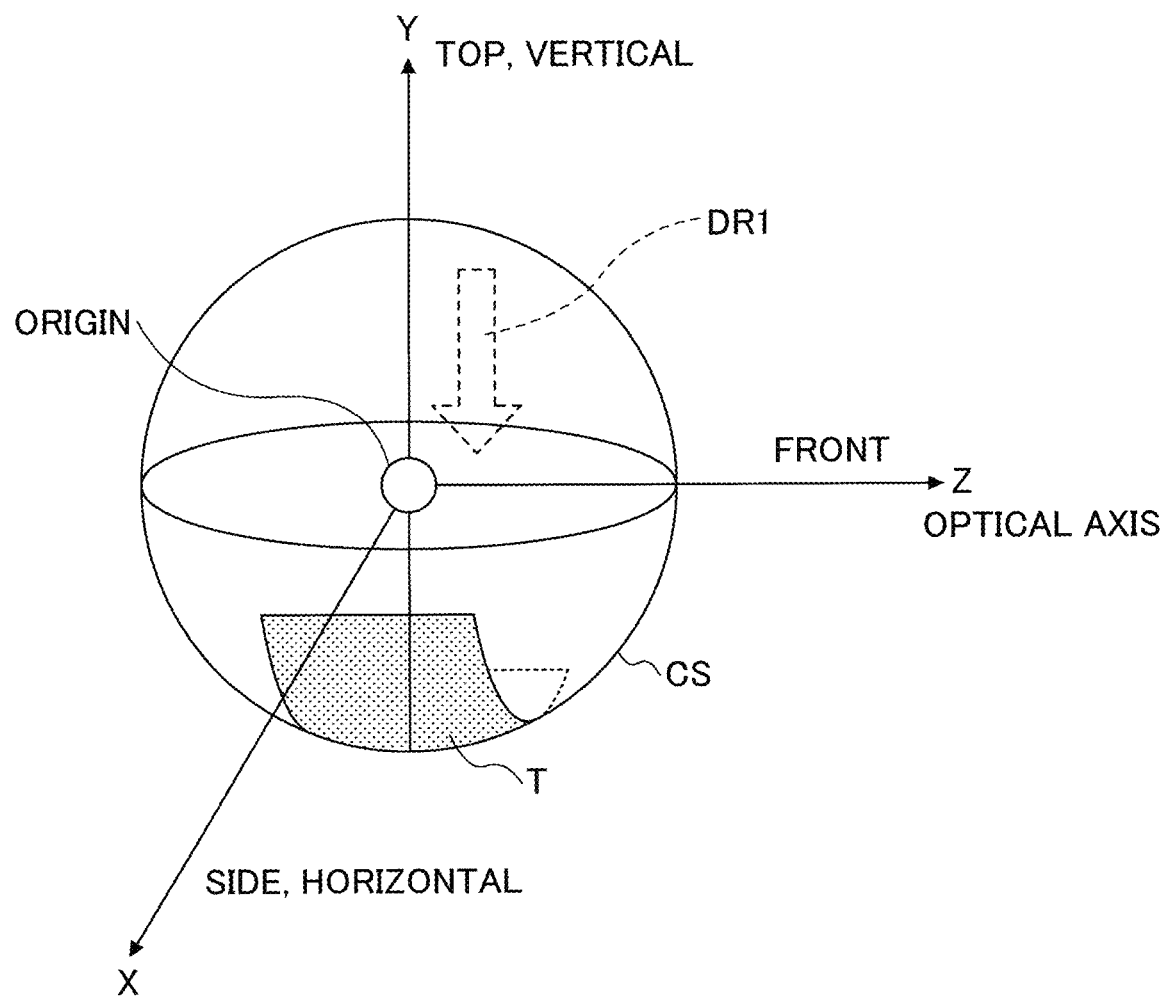
FIG. 31 is a diagram illustrating an example movement of a second image in an output image with a looking-down viewpoint according to an embodiment of the present invention.

FIG. 31 is a diagram illustrating an example movement of the second image in the output image with a looking-down viewpoint according to an embodiment of the present invention. FIG. 31 is a 3D model diagram similar to that illustrated in FIG. 29 that illustrates movement of the second image, namely, movement of the object, in the output image of FIG. 30. In FIG. 31, owing to viewpoint conversion of the output image to the looking-down viewpoint, the position of the predetermined region T is different from that illustrated in FIG. 29. As illustrated in FIG. 31, even if viewpoint conversion is performed, the smartphone 2 can generate an output image so that the object moves in the first direction DR1. Also, an image as illustrated in FIG. 32 may be output as an output image after viewpoint conversion, for example.

Figure 32:
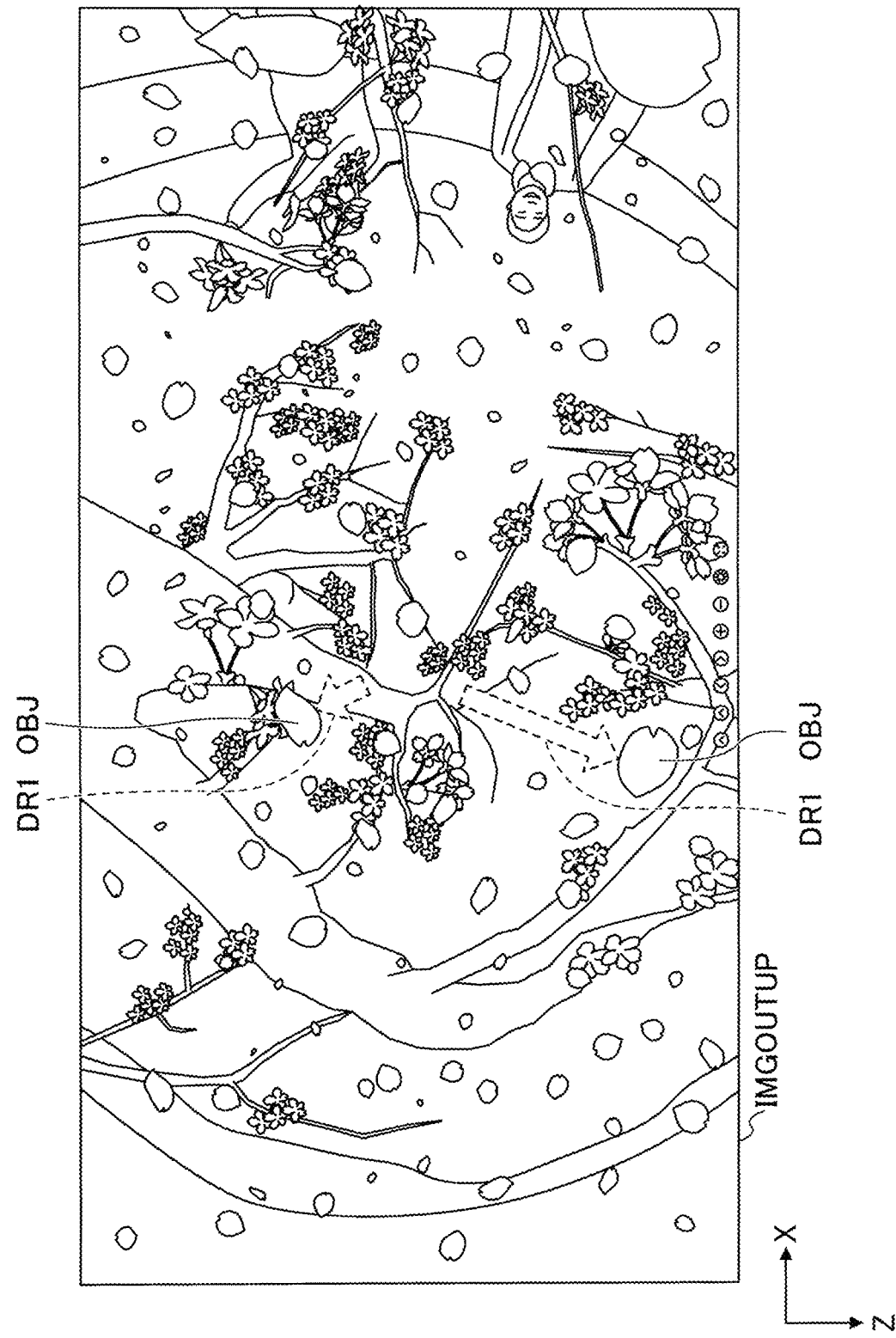
FIG. 32 is a diagram illustrating an example output image with a looking-up viewpoint according to an embodiment of the present invention.

FIG. 32 is a diagram illustrating an example output image with a looking-up viewpoint according to an embodiment of the present invention. FIG. 32 illustrates an output image IMGOUTUP as an example image output when the position of the predetermined region T corresponding to a region to be output is changed from that illustrated in FIG. 29. That is, the output image IMGOUTUP is an example image output when the viewpoint of the output image is changed to a so-called looking-up viewpoint corresponding to a viewpoint when looking from the bottom toward the top in the Y axis direction. In FIG. 32, the direction in which the object OBJ moves is in the first direction DR1 as in the case illustrated in FIG. 28.

In the output image IMGOUTUP, even if the direction in which the object OBJ moves is set up to be the same as that in FIG. 28, the object OBJ is displayed in a screen in a manner that is different from that in FIG. 28. Specifically, in the output image IMGOUTUP, as illustrated in FIG. 32, the object OBJ is output so as to move from the center of the screen toward the outer side of the screen and is gradually enlarged. That is, the object OBJ is output so as to move from the back to the front in the depth direction of the screen. That is, even when the viewpoint is changed to a looking-up viewpoint, the object OBJ is output so that the object OBJ corresponding to a "petal" appears to be falling in the first direction DR1 by gravity. As described above, when an output image is generated based on a 3D model, even if viewpoint conversion is performed, the smartphone 2 can output a second image so that it moves in a predetermined direction.

Figure 33:
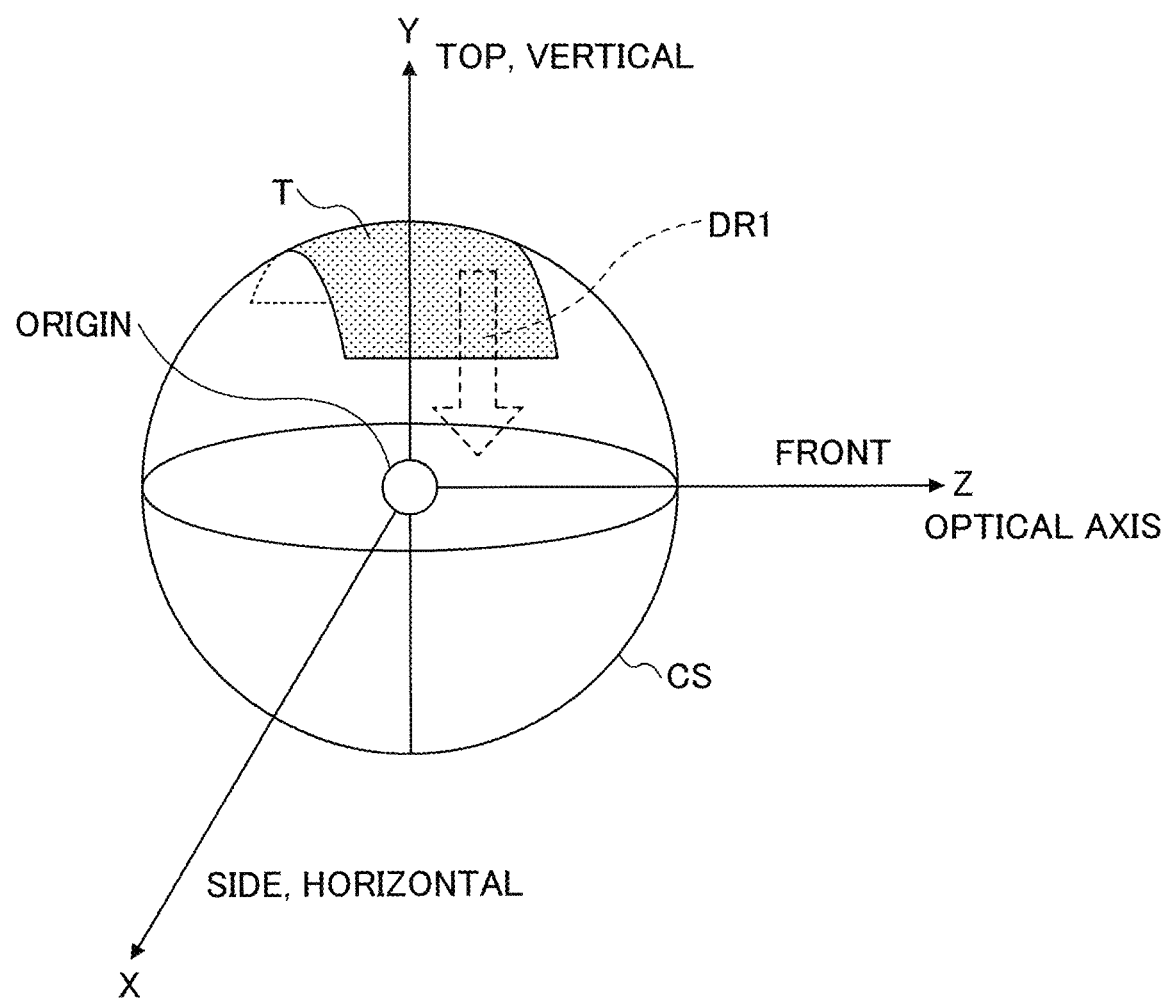
FIG. 33 is a diagram illustrating an example movement of a second image in an output image with a looking-up viewpoint according to an embodiment of the present invention.

FIG. 33 is a diagram illustrating an example movement of the second image in the output image with the looking-up viewpoint according to an embodiment of the present invention. FIG. 33 is a 3D model diagram similar to that illustrated in FIG. 29 that illustrates movement of a second image, namely, movement of an object, in the output image of FIG. 32. In FIG. 33, owing to viewpoint conversion of the output image to the looking-up viewpoint, the position of the predetermined region T is different from that illustrated in FIG. 29. As illustrated in FIG. 33, even if viewpoint conversion is performed, the smartphone 2 can generate an output image so that an object moves in the first direction DR1.

Further, because the output image is generated based on a 3D model, when a zooming process that involves changing the range of the predetermined region T of FIG. 29 is performed, the object OBJ may be output according to the zoom factor, for example. More specifically, for example, an image as illustrated in FIG. 34 may be output as an output image when a zoom-out process is performed.

Figure 34:
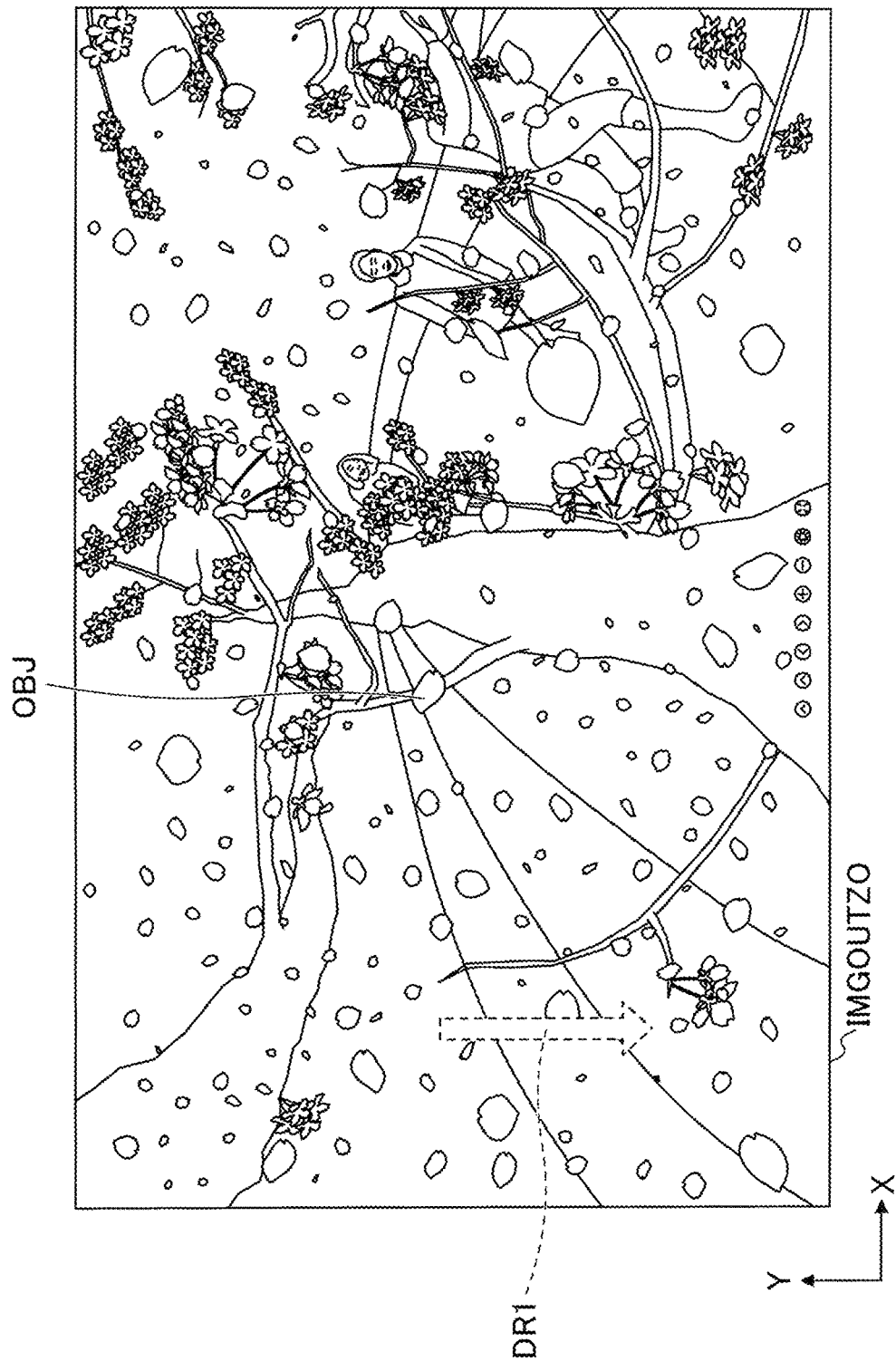
FIG. 34 is a diagram illustrating an example zoomed-out output image according to an embodiment of the present invention.

FIG. 34 illustrates an example of a zoomed-out output image according to an embodiment of the present invention. FIG. 34 illustrates a zoomed-out output image IMGOUTZO as an example output image resulting from performing a zoom-out process on the output image of FIG. 28 that indicates a wider range than the output image of FIG. 28. Note that other settings for the zoomed-out output image IMGOUTZO of FIG. 34 are assumed to be the same as those for the output image of FIG. 28. Specifically, for example, the direction in which the object OBJ moves is assumed to be in the first direction DR1. As such, in the zoomed-out output image IMGOUTZO of FIG. 34, objects imaged in the output image of FIG. 28 are output to be smaller. As illustrated in FIG. 34, the object OBJ is also output by the smartphone to appear smaller according to the zoom factor, for example. Also, when a zoom-in process is performed, an output image may be processed in a similar manner and an image as illustrated in FIG. 35 may be output as the resulting output image, for example.

Figure 35:
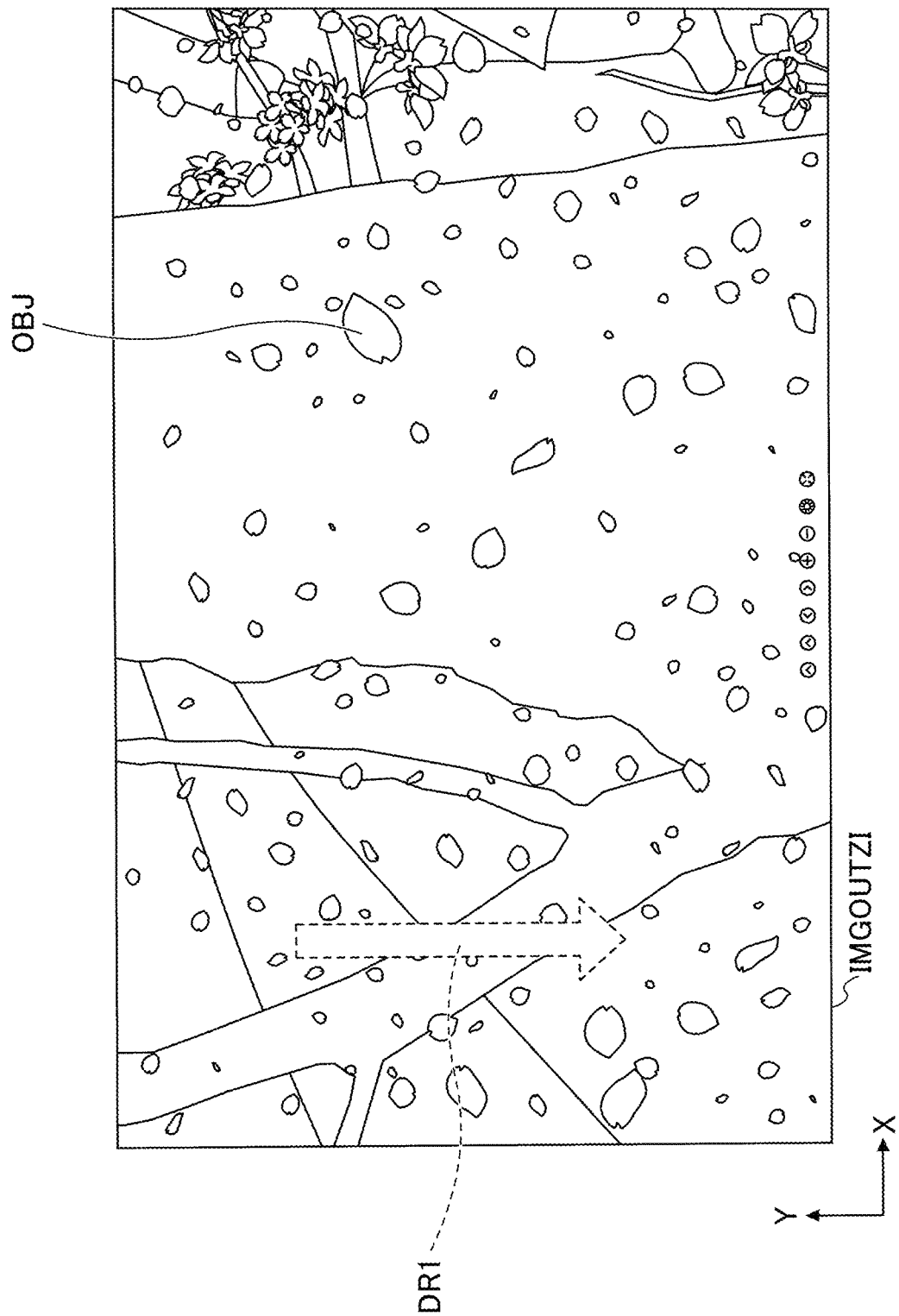
FIG. 35 is a diagram illustrating an example zoomed-in output image according to an embodiment of the present invention.

FIG. 35 is a diagram illustrating an example of a zoomed-in output image according to an embodiment of the present invention. FIG. 35 illustrates a zoomed-in output image IMGOUTZI as an example output image resulting from performing a zoom-in process on the output image of FIG. 28 that indicates a narrower range than the output image of FIG. 28. Note that other settings for the zoomed-in output image IMGOUTZI of FIG. 35 are assumed to be the same as those for the output image of FIG. 28. Specifically, for example, the direction in which the object OBJ moves is assumed to be in the first direction DR1. As such, in the zoomed-in output image IMGOUTZI of FIG. 35, objects imaged in the output image of FIG. 28 are output to be larger. Note that the zoom-in output image IMGOUTZI corresponds to an enlarged image of a center portion of the output image of FIG. 28. As illustrated in FIG. 35, the object OBJ is also output by the smartphone to appear larger according to the zoom factor, for example.

As described above, when an output image is generated based on a 3D model, even if a zooming process or a viewpoint conversion is performed, the smartphone 2 can output a second image in a corresponding size or in a corresponding moving direction, for example. In this way, the smartphone 2 can add a second image onto a first image to produce an enhanced presentation effect.

<Functional Configuration>

Figure 36:
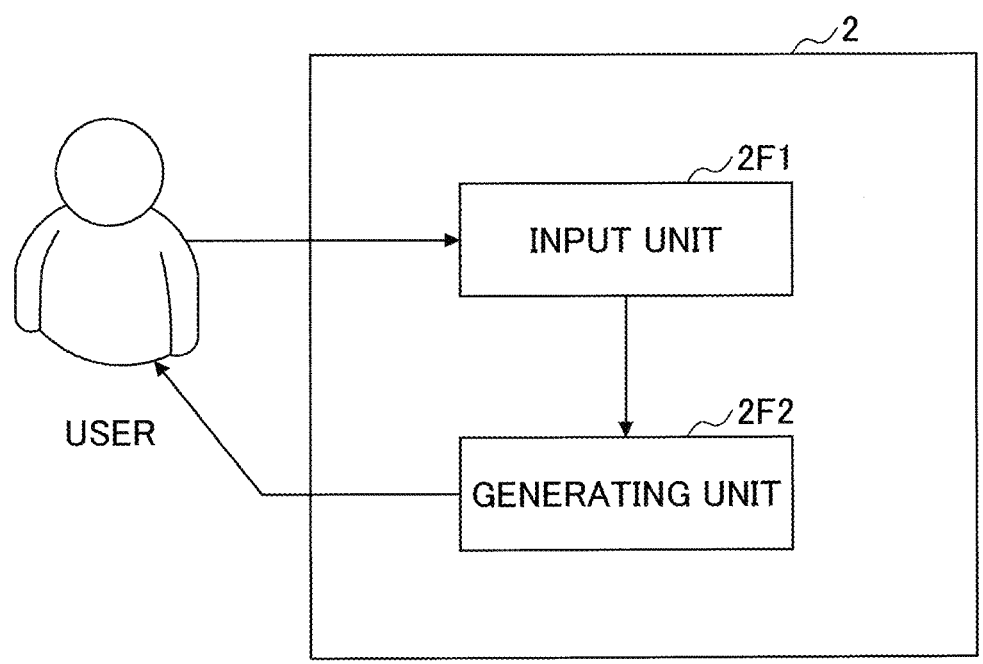
FIG. 36 is a block diagram illustrating an example functional configuration of an image processing apparatus according to an embodiment of the present invention.

FIG. 36 is a functional block diagram illustrating an example functional configuration of the image processing apparatus according to an embodiment of the present invention. In FIG. 36, the smartphone 2 as an example of the image processing apparatus includes an input unit 2F1 and a generating unit 2F2.

The input unit 2F1 inputs the first image and the second image to be added onto the first image. For example, the input unit 2F1 may be implemented by the input/output device 2H3 (FIG. 8) and the like.

The generating unit 2F2 generates an output image based on a 3D model by arranging the second image on the 3D model having the first image arranged thereon. For example, the generating unit 2F2 may be implemented by the CPU 2H5 (FIG. 8) and the like.

The smartphone 2 may further include a recognizing unit that recognizes an image included in the first image. For example, the recognizing unit may be implemented by the CPU 2H5 (FIG. 8).

By generating an output image based on a 3D model in the above-described manner, the smartphone 2 can output an output image so that a second image arranged on the 3D model moves in a predetermined direction. That is, the smartphone 2 can output the second image to move in a predetermined direction even if a viewpoint conversion, a zooming process, or a combination thereof is performed.

For example, in a case where the second image is simply superimposed on the first image and output so as to move from the top to the bottom of the screen, when a viewpoint conversion is performed, for example, the second image will not be output so as to move in a corresponding direction in accordance with the viewpoint conversion. That is, even if a viewpoint conversion is performed, the second image will always be output so as to move from the top to the bottom of the screen. On the other hand, with the functional configuration as illustrated in FIG. 36, an output image is generated based on a 3D model, and as such, the direction in which the second image moves may be altered in accordance with a viewpoint conversion, for example. Accordingly, as illustrated in FIG. 30, for example, even if a viewpoint conversion is performed, the smartphone 2 may add a second image onto an image representing the first image so as to produce an enhanced presentation effect such that of petals fluttering.

Note that an embodiment of the present invention may be implemented by a program written in a programming language, for example. That is, an embodiment of the present invention may be implemented by a program for causing a computer, such as an image processing apparatus, to execute an image processing method. The program may be stored in a recording medium, such as a flash memory, an SD (registered trademark) card, or an optical disk, and distributed in such state, for example. Also, the program may be distributed via an electric communication line such as the Internet, for example.

Also, according to an embodiment of the present invention, some or all processes may be implemented by a programmable device (PD) such as a field programmable gate array (FPGA), for example. Further, according to an embodiment of the present invention, a part or all processes may be implemented by an ASIC (Application Specific Integrated Circuit), for example.

Further, an information processing apparatus according to an embodiment of the present invention is not limited to a smartphone, and may be a server or the like, for example. Further, the information processing apparatus is not limited to one information processing apparatus, and may be constituted by a plurality of information processing apparatuses. That is, an embodiment of the present invention may be implemented by an image processing system including one or more information processing apparatuses, for example.

Although the present invention has been described above with respect to certain illustrative embodiments, the present invention is not limited to these embodiments. That is, numerous additional modifications and variations may be made in light of the above teachings without departing from the scope of the present invention. It is therefore to be understood that, within the scope of the appended claims, the disclosure of the present specification may be practiced otherwise than as specifically described herein.

As can be appreciated by those skilled in the computer arts, the present invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits (ASIC) or by interconnecting an appropriate network of conventional component circuits, as will be readily apparent to those skilled in the relevant art.

Each of the functions of the described embodiments may be implemented by one or more processing circuits. A processing circuit includes a programmed processor. A processing circuit also includes devices such as an application specific integrated circuit (ASIC) and conventional circuit components arranged to perform the recited functions. Processing circuitry for executing one or more functions of the described embodiments may be implemented as at least a portion of a microprocessor. The processing circuitry may be implemented using one or more circuits, one or more microprocessors, microcontrollers, application specific integrated circuits, dedicated hardware, digital signal processors, microcomputers, central processing units, field programmable gate arrays, programmable logic devices, state machines, super computers, or any combination thereof. Also, the processing circuitry may include one or more software modules executable within one or more processing circuits. The processing circuitry may further include memory configured to store instructions and/or code that causes the processing circuitry to execute functions.

If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

What is claimed is:

1. An image processing apparatus comprising:
   processing circuitry configured to
      input a first image of a first object captured with a camera and a second image of a second object, the second object being different from the first object;
      generate an output image by arranging the second image onto a 3D model having the first image arranged thereon; and
      define a horizontal direction of the 3D model as an x-axis direction, define a vertical direction of the 3D model as a y-axis direction, and define a depth direction of the 3D model as a z-axis direction, wherein
         after an operation to change a viewpoint is performed with respect to the first image, the processing circuitry further generates the output image in which the second image is output so as to move in a predetermined direction in a three-dimensional coordinate system expressed by the x-axis, the y-axis, and the z-axis over a sequence of frames of the first image.

2. The image processing apparatus according to claim 1, wherein
   the first image includes additional information; and
   the second image is specified based on the additional information.

3. The image processing apparatus according to claim 1, wherein
   the processing circuitry is further configured to recognize an image included in the first image; and
   the second image corresponds to an image indicating content that is identical or similar to the recognized image included in the first image.

4. The image processing apparatus according to claim 1, wherein the first image corresponds to an image captured by an image capturing apparatus or an image generated based on a plurality of images captured by a plurality of image capturing apparatuses.

5. The image processing apparatus according to claim 1, wherein the processing circuitry is further configured to set up a direction in which the second image moves, a position at which the second image starts to be output, a speed at which the second image moves, or a combination thereof.

6. The image processing apparatus according to claim 1, wherein
   the first image is an omnidirectional image.

7. An image processing system including at least one information processing apparatus, the image processing system comprising:
   processing circuitry configured to
      input a first image of a first object captured with a camera and a second image of a second object, the second object being different from the first object; and generate an output image by arranging the second image onto a 3D model having the first image arranged thereon; and define a horizontal direction of the 3D model as an x-axis direction, define a vertical direction of the 3D model as a y-axis direction, and define a depth direction of the 3D model as a z-axis direction, wherein after an operation to change a viewpoint is performed with respect to the first image, the processing circuitry further generates the output image in which the second image is output so as to move in a predetermined direction in a three-dimensional coordinate system expressed by the x-axis, the y-axis, and the z-axis over a sequence of frames of the first image.

8. The image processing system according to claim 7, wherein the first image is an omnidirectional image.

9. An image processing method implemented by an image processing apparatus, the image processing method comprising:

inputting a first image of a first object captured with a camera and a second image of a second object, the second object being different from the first object; and generating an output image by arranging the second image onto a 3D model having the first image arranged thereon; and define a horizontal direction of the 3D model as an x-axis direction, define a vertical direction of the 3D model as a y-axis direction, and define a depth direction of the 3D model as a z-axis direction, wherein after an operation to change a viewpoint is performed with respect to the first image, the processing circuitry further generates the output image in which the second image is output so as to move in a predetermined direction in a three-dimensional coordinate system expressed by the x-axis, the y-axis, and the z-axis over a sequence of frames of the first image.

10. The image processing method according to claim 9, wherein the first image is an omnidirectional image.

* * * * *